(12) United States Patent
Ke

(10) Patent No.: US 11,385,444 B2
(45) Date of Patent: Jul. 12, 2022

(54) MICRO LENS ASSEMBLY FOR SHORT-RANGE IMAGING

(71) Applicant: NEWMAX TECHNOLOGY CO., LTD., Taichung (TW)

(72) Inventor: Sian-Chih Ke, Taichung (TW)

(73) Assignee: NEWMAX TECHNOLOGY CO., LTD., Taichung (TW)

(*) Notice: Subject to any disclaimer, the term of this patent is extended or adjusted under 35 U.S.C. 154(b) by 321 days.

(21) Appl. No.: 16/868,556

(22) Filed: May 7, 2020

(65) Prior Publication Data

US 2021/0349288 A1    Nov. 11, 2021

(51) Int. Cl.
   *G02B 9/06*     (2006.01)
   *G02B 13/00*    (2006.01)
   *G02B 5/20*     (2006.01)
   *G02B 9/64*     (2006.01)

(52) U.S. Cl.
   CPC ......... *G02B 13/0045* (2013.01); *G02B 5/208* (2013.01); *G02B 9/64* (2013.01)

(58) Field of Classification Search
   CPC ...... G02B 9/06; G02B 13/0045; G02B 5/208; G02B 9/64; G02B 13/00; G02B 5/20; G02B 13/24; G02B 13/0015; G02B 13/0055

See application file for complete search history.

(56) References Cited

U.S. PATENT DOCUMENTS

| | | | | |
|---|---|---|---|---|
| 4,805,999 A | * | 2/1989 | Ueda | G02B 15/144507 359/679 |
| 4,997,265 A | * | 3/1991 | Nishina | G02B 15/1465 359/679 |
| 5,886,835 A | * | 3/1999 | Suzuki | G02B 13/16 359/740 |
| 5,914,819 A | * | 6/1999 | Kondo | G02B 15/144507 359/686 |
| 2008/0192338 A1 | * | 8/2008 | Winterot | G02B 21/22 359/376 |
| 2009/0141368 A1 | * | 6/2009 | Iyama | G02B 13/18 359/717 |
| 2011/0157721 A1 | * | 6/2011 | Ohtake | G02B 7/102 359/695 |
| 2016/0109687 A1 | * | 4/2016 | Son | G02B 9/64 359/755 |
| 2017/0293107 A1 | * | 10/2017 | Wang | G02B 13/0045 |
| 2020/0249432 A1 | * | 8/2020 | Bao | H04N 5/2254 |

* cited by examiner

*Primary Examiner* — Balram T Parbadia
(74) *Attorney, Agent, or Firm* — Bruce Stone LLP; Joseph A. Bruce

(57) ABSTRACT

A micro lens assembly for short-range imaging, in order from the object side to the image side: a flat panel, a first lens group, a stop, a second lens group, and an IR cut filter. Wherein a focal length of the first lens group combined is LF, a focal length of the second lens group combined is RF, a distance from an object to be imaged to an object-side surface of a first lens element of the first lens group along an optical axis is OTL, a distance from the object to be imaged to an image plane along the optical axis is TTL, and they satisfy the relations: LF>0; RF>0; 0.65<LF/RF<1.25; OTL<2.0 mm; TTL<10 mm Such a lens assembly can obtain higher short-range imaging effect while maintaining its miniaturization and can reduce the aberration in short-range imaging.

8 Claims, 13 Drawing Sheets

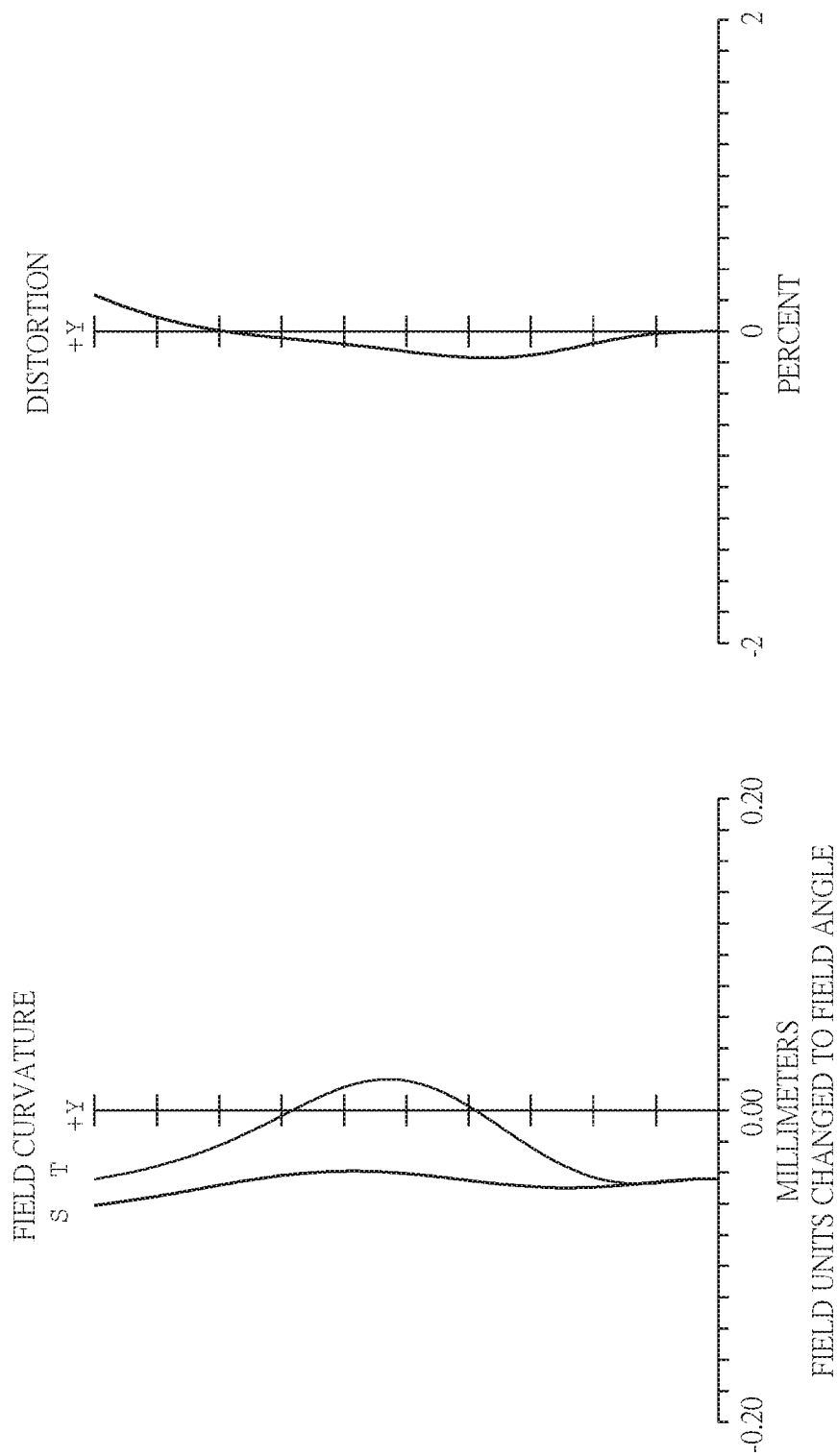

MICRO LENS ASSEMBLY FOR SHORT-RANGE IMAGING

BACKGROUND

Field of the Invention

The present invention relates to an optical lens system, and more particularly to a micro lens assembly for short-range imaging.

Description of the Prior Art

Imaging devices are becoming more and more popular in life, and imaging devices such as mobile phone cameras, computer cameras, tachographs and surveillance cameras appear in people's daily life every day. As more and more functional requirements for imaging devices are required in daily life, short-range objects, such as micro-range imaging or even micro-imaging, are also needed. Therefore, how to obtain higher short-range imaging effect while maintaining its miniaturization, big stop and high pixel, and effectively reduce the aberration and manufacturing cost in micro-range imaging is the technical bottleneck to be overcome.

The present invention mitigates and/or obviates the aforementioned disadvantages.

SUMMARY

The primary objective of the present invention is to provide a micro lens assembly for short-range imaging for overcoming the above technical problems.

Therefore, a micro lens assembly for short-range imaging in accordance with the present invention comprises, in order from an object side to an image side: a flat panel made of glass; a first lens group having a plurality of lens elements, a first lens element of the first lens group having an object-side surface being concave near an optical axis, being aspheric and provided with an inflection point; a stop; a second lens group having a plurality of lens elements; and an IR cut filter made of glass.

Wherein a focal length of the first lens group combined is LF, a focal length of the second lens group combined is RF, a distance from an object to be imaged to the object-side surface of the first lens element of the first lens group along the optical axis is OTL, a distance from the object to be imaged to an image plane along the optical axis is TTL, and they satisfy the relations: LF>0; RF>0; 0.65<LF/RF<1.25; OTL<2.0 mm; TTL<10 mm.

With the design of the two lens groups and the aforementioned relations, such a lens assembly can obtain higher short-range imaging effect while maintaining its miniaturization and can effectively reduce the aberration in short-range imaging, especially distortion and color aberration. It can also effectively reduce the diameter of a lens, reduce the size of the lens, the processing difficulty and cost, has big stop and high pixel, and can effectively reduce the total optical tube length of the lens and a detector.

Preferably, wherein the first lens group comprises at least three lens elements, which has big stop and high pixel, and can effectively reduce the aberration in short-range imaging.

Preferably, wherein the first two lens elements of the first lens group is, in order from the object side to the image side: the first lens element and a second lens element. Wherein the first lens element of the first lens group has the object-side surface being concave near the optical axis; the second lens element of the first lens group has an object-side surface being convex near the optical axis and an image-side surface being concave near the optical axis, so as to obtain higher short-range imaging effect while maintaining its miniaturization.

Preferably, wherein the last two lens elements of the first lens group is, in order from the object side to the image side: the penultimate lens element and the last lens element. Wherein the penultimate lens element of the first lens group with a negative refractive power, the last lens element of the first lens group with a positive refractive power having an image-side surface being convex near the optical axis, so as to effectively reduce the diameter of the lens and reduce the size of the lens.

Preferably, wherein the second lens group comprises at least three lens elements, which has big stop and high pixel, and can effectively reduce the aberration in short-range imaging.

Preferably, wherein the first two lens elements of the second lens group is, in order from the object side to the image side: a first lens element and a second lens element. Wherein the first lens element of the second lens group with a positive refractive power having an object-side surface being convex near the optical axis; the second lens element of the second lens group with a negative refractive power, so as to effectively reduce the diameter of the lens and reduce the size of the lens.

Preferably, wherein the last two lens elements of the second lens group is, in order from the object side to the image side: the penultimate lens element and the last lens element. Wherein the penultimate lens element of the second lens group having an object-side surface being concave near the optical axis and an image-side surface being convex near the optical axis, the last lens element of the second lens group having an image-side surface being concave near the optical axis, so as to obtain higher short-range imaging effect while maintaining its miniaturization.

Preferably, a focal length of the micro lens assembly for short-range imaging is f, the focal length of the first lens group combined is LF, the focal length of the second lens group combined is RF, and they satisfy the relations: 0.3<f/LF<0.7; 0.3<f/RF<0.7, it will be favorable to maintain the objective of miniaturization and long focus of the micro lens assembly for short-range imaging, which can be used in thin electronic products.

The present invention will be presented in further details from the following descriptions with the accompanying drawings, which show, for purpose of illustrations only, the preferred embodiments in accordance with the present invention.

BRIEF DESCRIPTION OF THE DRAWINGS

FIG. 1C shows the image plane curve and the distortion curve of the first embodiment of the present invention;

DETAILED DESCRIPTION

Figure 1A:
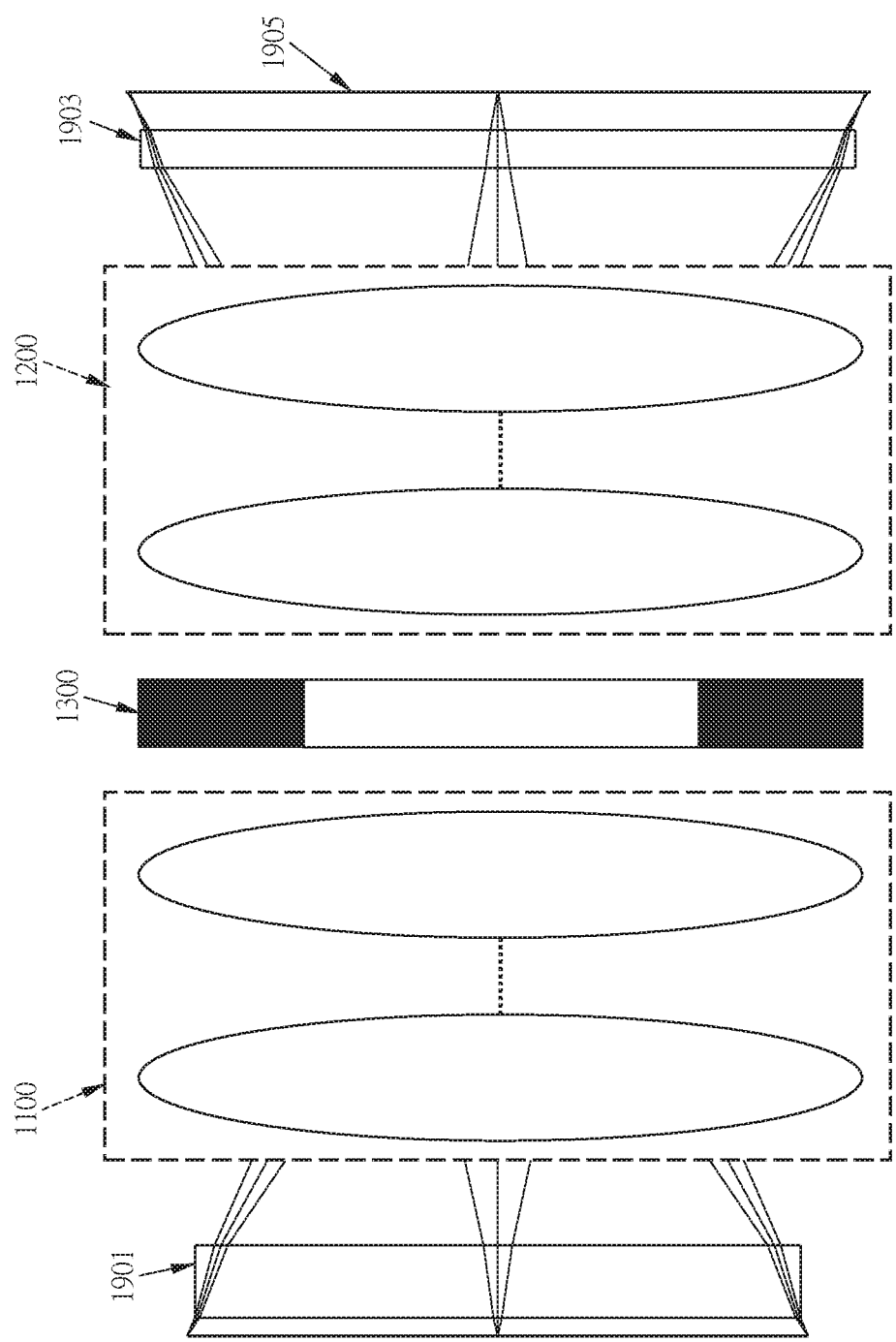
FIG. 1A shows a micro lens assembly for short-range imaging in accordance with a first embodiment of the present invention.
Figure 1B:
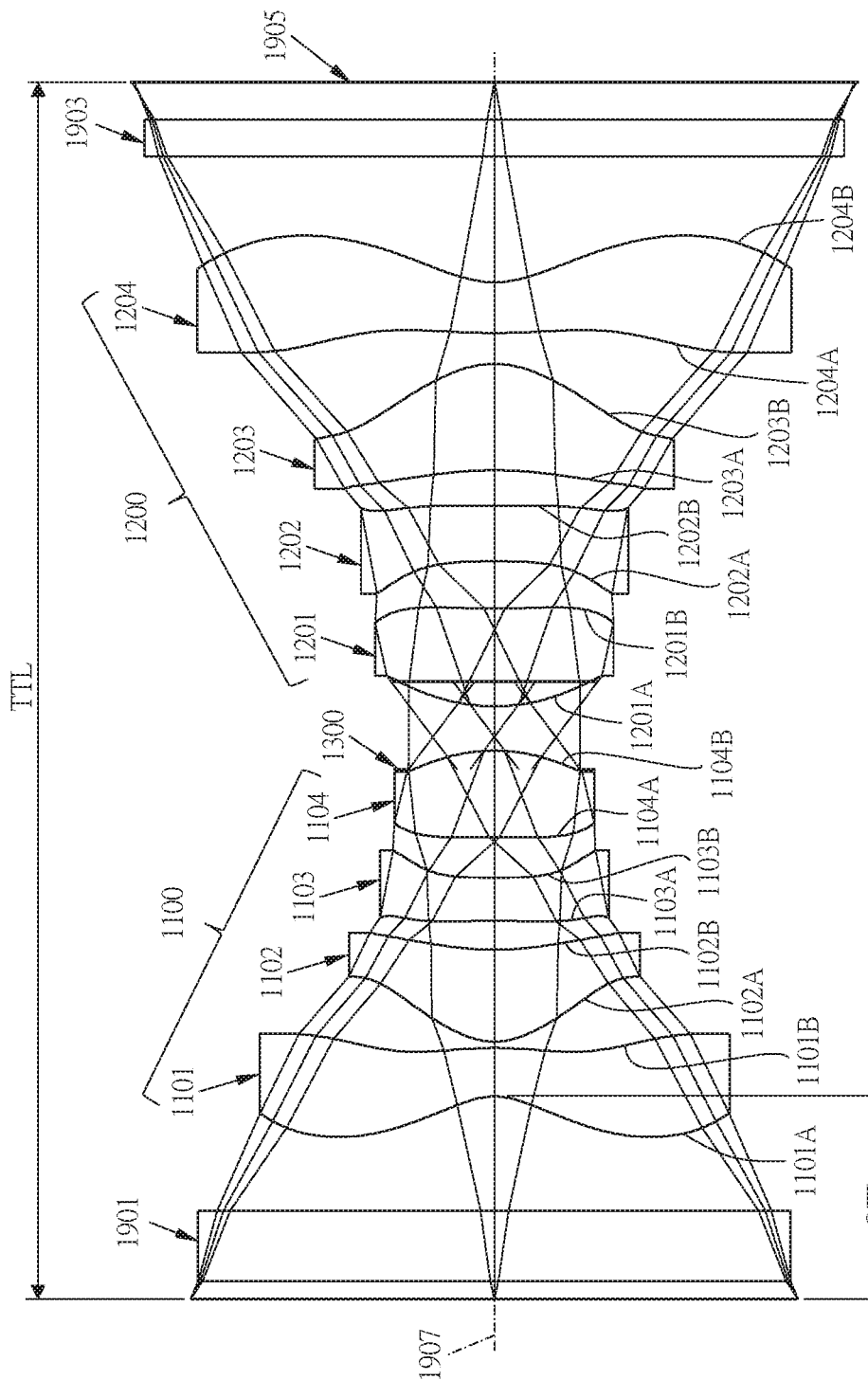
FIG. 1B is a detailed view of FIG. 1A.

Referring to FIGS. 1A, 1B and 1C, FIGS. 1A and 1B show a micro lens assembly for short-range imaging in accordance with a first embodiment of the present invention, and FIG. 1C shows, in order from left to right, the image plane curve and the distortion curve of the first embodiment of the present invention. A micro lens assembly for short-range imaging in accordance with the first embodiment of the present invention comprises a stop 1300 and a lens group. The lens group comprises, in order from an object side to an image side: a flat panel 1901, a first lens group 1100, a second lens group 1200, an IR cut filter 1903, and an image plane 1905. The first lens group 1100 comprises four lens elements, in order from the object side to the image side: a first lens element 1101, a second lens element 1102, a third lens element 1103, and a fourth lens element 1104. The second lens group 1200 comprises four lens elements, in order from the object side to the image side: a fifth lens element 1201, a sixth lens element 1202, a seventh lens element 1203, and an eighth lens element 1204. Wherein the micro lens assembly for short-range imaging has a total of eight lens elements with refractive power.

The stop 1300 is disposed between the first lens group 1100 and the second lens group 1200, and is located between the fourth lens element 1104 and the fifth lens element 1201.

The flat panel 1901 made of glass is located between an object to be imaged and the first lens element 1101 and has no influence on the focal length of the micro lens assembly for short-range imaging.

The first lens group 1100 comprises, in order from the object side to the image side: the first lens element 1101, the second lens element 1102, the third lens element 1103, and the fourth lens element 1104.

The first lens element 1101 with a negative refractive power has an object-side surface 1101A being concave near an optical axis 1907 and an image-side surface 1101B being convex near the optical axis 1907, the object-side surface 1101A is provided with an inflection point, the object-side surface 1101A and the image-side surface 1101B are aspheric, and the first lens element 1101 is made of plastic material.

The second lens element 1102 with a positive refractive power has an object-side surface 1102A being convex near the optical axis 1907 and an image-side surface 1102B being concave near the optical axis 1907, the object-side surface 1102A and the image-side surface 1102B are aspheric, and the second lens element 1102 is made of plastic material.

The third lens element 1103 with a negative refractive power has an object-side surface 1103A being concave near the optical axis 1907 and an image-side surface 1103B being concave near the optical axis 1907, the object-side surface 1103A and the image-side surface 1103B are aspheric, and the third lens element 1103 is made of plastic material.

The fourth lens element 1104 with a positive refractive power has an object-side surface 1104A being concave near the optical axis 1907 and an image-side surface 1104B being convex near the optical axis 1907, the object-side surface 1104A and the image-side surface 1104B are aspheric, and the fourth lens element 1104 is made of plastic material.

The second lens group 1200 comprises, in order from the object side to the image side: the fifth lens element 1201, the sixth lens element 1202, the seventh lens element 1203, and the eighth lens element 1204.

The fifth lens element 1201 with a positive refractive power has an object-side surface 1201A being convex near the optical axis 1907 and an image-side surface 1201B being concave near the optical axis 1907, the object-side surface 1201A and the image-side surface 1201B are aspheric, and the fifth lens element 1201 is made of plastic material.

The sixth lens element 1202 with a negative refractive power has an object-side surface 1202A being concave near the optical axis 1907 and an image-side surface 1202B being concave near the optical axis 1907, the object-side surface 1202A and the image-side surface 1202B are aspheric, and the sixth lens element 1202 is made of plastic material.

The seventh lens element 1203 with a positive refractive power has an object-side surface 1203A being concave near the optical axis 1907 and an image-side surface 1203B being convex near the optical axis 1907, the object-side surface 1203A and the image-side surface 1203B are aspheric, and the seventh lens element 1203 is made of plastic material.

The eighth lens element 1204 with a negative refractive power has an object-side surface 1204A being convex near the optical axis 1907 and an image-side surface 1204B being concave near the optical axis 1907, the object-side surface 1204A and the image-side surface 1204B are provided with inflection points and are aspheric, and the eighth lens element 1204 is made of plastic material.

The IR cut filter 1903 is located between the eighth lens element 1204 and the image plane 1905 and has no influence on the focal length of the micro lens assembly for short-range imaging.

The equation for the aspheric surface profiles of the respective lens elements of the first embodiment is expressed as follows:

$$z = \frac{ch^2}{1 + [1-(k+1)c^2h^2]^{0.5}} + Ah^4 + Bh^6 + Ch^8 + Dh^{10} + Eh^{12} + Fh^{14} + Gh^{16}$$

wherein:

z represents the value of a reference position with respect to a vertex of the surface of a lens and a position with a height h along the optical axis 190;

c represents a paraxial curvature equal to 1/R (R: a paraxial radius of curvature);

h represents a vertical distance from the point on the curve of the aspheric surface to the optical axis 190;

k represents the conic constant;

A, B, C, D, E, F, G, . . . : represent the high-order aspheric coefficients.

In the first embodiment of the present micro lens assembly for short-range imaging, a focal length of the micro lens assembly for short-range imaging is f, an object-side numerical aperture of the micro lens assembly for short-range imaging is NA, and they satisfy the relations: f=1.22 mm; and NA=0.23 mm.

In the first embodiment of the present micro lens assembly for short-range imaging, a focal length of the first lens group 1100 combined is LF, a focal length of the second lens group 1200 combined is RF, and they satisfy the relations: LF=2.23; RF=2.69; LF/RF=0.83.

In the first embodiment of the present micro lens assembly for short-range imaging, a distance from the object to be imaged to the object-side surface 1101A of the first lens element 1101 of the first lens group 1100 along the optical axis 1907 is OTL, and it satisfies the relation: OTL=1.14 mm.

In the first embodiment of the present micro lens assembly for short-range imaging, a distance from the object to be imaged to the image plane 1905 along the optical axis 1907 is TTL, and it satisfies the relation: TTL=6.85.

In the first embodiment of the present micro lens assembly for short-range imaging, the focal length of the micro lens assembly for short-range imaging is f, the focal length of the first lens group 1100 combined is LF, the focal length of the second lens group 1200 combined is RF, and they satisfy the relations: f/LF=0.55; f/RF=0.46.

The detailed optical data of the first embodiment is shown in table 1, and the aspheric surface data is shown in table 2.

TABLE 1

Embodiment 1
f(focal length) = 1.22 mm, NA = 0.23 mm

| surface | | Curvature Radius | | Thickness | Material | Index | Abbe # | Focal length |
|---|---|---|---|---|---|---|---|---|
| 0 | object | infinity | | 0.000 | | | | |
| 1 | test surface | infinity | | 0.100 | | | | |
| 2 | flat panel | infinity | | 0.400 | glass | 1.517 | 64 | — |
| 3 | | infinity | | 0.642 | | | | |
| 4 | Lens 1 | −0.453 | (ASP) | 0.273 | plastic | 1.544 | 56 | −1.05 |
| 5 | | −2.599 | (ASP) | 0.035 | | | | |
| 6 | Lens 2 | 0.463 | (ASP) | 0.518 | plastic | 1.544 | 56 | 0.98 |
| 7 | | 2.049 | (ASP) | 0.161 | | | | |
| 8 | Lens 3 | −7.394 | (ASP) | 0.244 | plastic | 1.661 | 20.4 | −5.59 |
| 9 | | 7.615 | (ASP) | 0.231 | | | | |
| 10 | Lens 4 | −9.632 | (ASP) | 0.485 | plastic | 1.544 | 56 | 2.48 |
| 11 | | −1.209 | (ASP) | −0.105 | | | | |
| 12 | stop | infinity | | 0.495 | | | | |
| 13 | shading surface | infinity | | −0.140 | | | | |
| 14 | Lens 5 | 1.324 | (ASP) | 0.551 | plastic | 1.544 | 56 | 2.90 |
| 15 | | 6.888 | (ASP) | 0.267 | | | | |
| 16 | Lens 6 | −5.237 | (ASP) | 0.310 | plastic | 1.661 | 20.4 | −6.81 |
| 17 | | 34.981 | (ASP) | 0.202 | | | | |
| 18 | Lens 7 | −2.666 | (ASP) | 0.599 | plastic | 1.544 | 56 | 1.42 |
| 19 | | −0.648 | (ASP) | 0.173 | | | | |
| 20 | Lens 8 | 4.171 | (ASP) | 0.286 | plastic | 1.544 | 56 | −1.48 |
| 21 | | 0.660 | (ASP) | 0.707 | | | | |
| 22 | IR-filter | infinity | | 0.210 | glass | 1.517 | 64 | — |
| 23 | | infinity | | 0.210 | | | | |
| 24 | Image plane | infinity | | infinity | | | | |

TABLE 2

Aspheric Coefficients

| surface | 4 | 5 | 6 | 7 | 8 | 9 |
|---|---|---|---|---|---|---|
| K: | −5.3262E+00 | 1.5806E+00 | −3.9236E+00 | −1.4290E+00 | 9.2130E+00 | −2.1146E+01 |
| A: | 3.3135E−01 | 4.9885E−01 | 6.6504E−01 | −1.0859E−01 | 3.7000E−01 | 8.4327E−01 |
| B: | −3.5672E−01 | −1.8476E−01 | −2.0699E+00 | −1.1413E+00 | −2.1085E−01 | 1.5780E+00 |
| C: | 3.2884E−01 | −2.0193E−01 | 5.4990E+00 | 5.3983E+00 | 3.2537E+00 | −1.5948E+01 |
| D: | −2.1930E−01 | 2.1991E−01 | −1.2459E+01 | −1.2080E+01 | −1.3464E+01 | 1.3823E+02 |
| E: | 9.6054E−02 | −7.6687E−02 | 1.4786E+01 | 1.7887E+01 | 3.0789E+01 | −5.7351E+02 |
| F: | −2.4080E−02 | 7.3658E−03 | −8.2115E+00 | −1.8845E+01 | −5.4793E+01 | 9.9677E+02 |
| G: | 2.6042E−03 | 1.0456E−03 | 1.7174E+00 | 9.9187E+00 | 4.0218E+01 | −6.1520E+02 |

| surface | 10 | 11 | 14 | 15 | 16 | 17 |
|---|---|---|---|---|---|---|
| K: | −5.4071E+01 | −4.5069E+00 | −3.2876E+00 | −5.0782E+01 | −1.3914E+00 | 6.3598E+01 |
| A: | 3.3031E−01 | −2.0845E−01 | 1.4454E−01 | −1.7343E−01 | −4.4649E−01 | −1.7485E−01 |
| B: | 2.1438E−01 | −2.1972E−01 | 6.2171E−02 | 7.4226E−03 | −5.6462E−01 | 1.1955E−01 |
| C: | 9.1331E+00 | 8.2454E+00 | −2.0109E+00 | −2.3885E+00 | 3.9985E+00 | −7.8680E−01 |
| D: | −6.7513E+01 | −8.0492E+01 | 1.2859E+00 | 1.0147E+01 | −2.2284E+01 | 2.2723E+00 |
| E: | 2.5877E+02 | 4.2372E+02 | −4.4761E+01 | −2.7171E+01 | 6.2038E+01 | −3.1790E+00 |
| F: | −5.1063E+02 | −1.0703E+03 | 7.6499E+01 | 3.9344E+01 | −7.3036E+01 | 3.9902E+00 |
| G: | 4.0292E+02 | 1.0516E+03 | −5.2335E+01 | −2.3314E+01 | 2.9860E+01 | −2.2352E+00 |

TABLE 2-continued

| | Aspheric Coefficients | | | |
|---|---|---|---|---|
| surface | 18 | 19 | 20 | 21 |
| K: | −1.0235E+01 | −3.6613E+00 | 3.6309E+00 | −5.1445E+00 |
| A: | 3.1919E−02 | −2.8792E−01 | −2.2993E−01 | 6.2334E−01 |
| B: | 3.5151E−01 | 7.4729E−01 | 4.2790E−02 | 1.7980E+00 |
| C: | −1.1955E+00 | −1.3632E+00 | 5.3699E−02 | −1.6452E+01 |
| D: | 1.9191E+00 | 1.9777E+00 | −3.3397E−02 | 4.6006E+01 |
| E: | −1.9475E+00 | −1.5593E+00 | 7.4226E−03 | −7.0441E+01 |
| F: | 1.3786E+00 | 5.8751E−01 | −5.6847E−04 | 3.7539E+01 |
| G: | −5.1358E−01 | −8.5186E−02 | −1.4045E−05 | 1.5713E+01 |

The units of the radius of curvature, the thickness and the focal length in table 1 are expressed in mm, the surface numbers 0-24 represent the surfaces sequentially arranged from the object-side to the image-side along the optical axis, and the test surface (i.e. surface 1) and the shading surface (i.e. surface 13) for allowing part of the light to pass through and part of the light shield. In table 2, k represents the conic coefficient of the equation of the aspheric surface profiles, and A, B, C, D . . . : represent the high-order aspheric coefficients. The tables presented below for each embodiment are the corresponding schematic parameter, image plane curves and distortion curves, and the definitions of the tables are the same as Table 1 and Table 2 of the first embodiment. Therefore, an explanation in this regard will not be provided again.

Figure 2A:
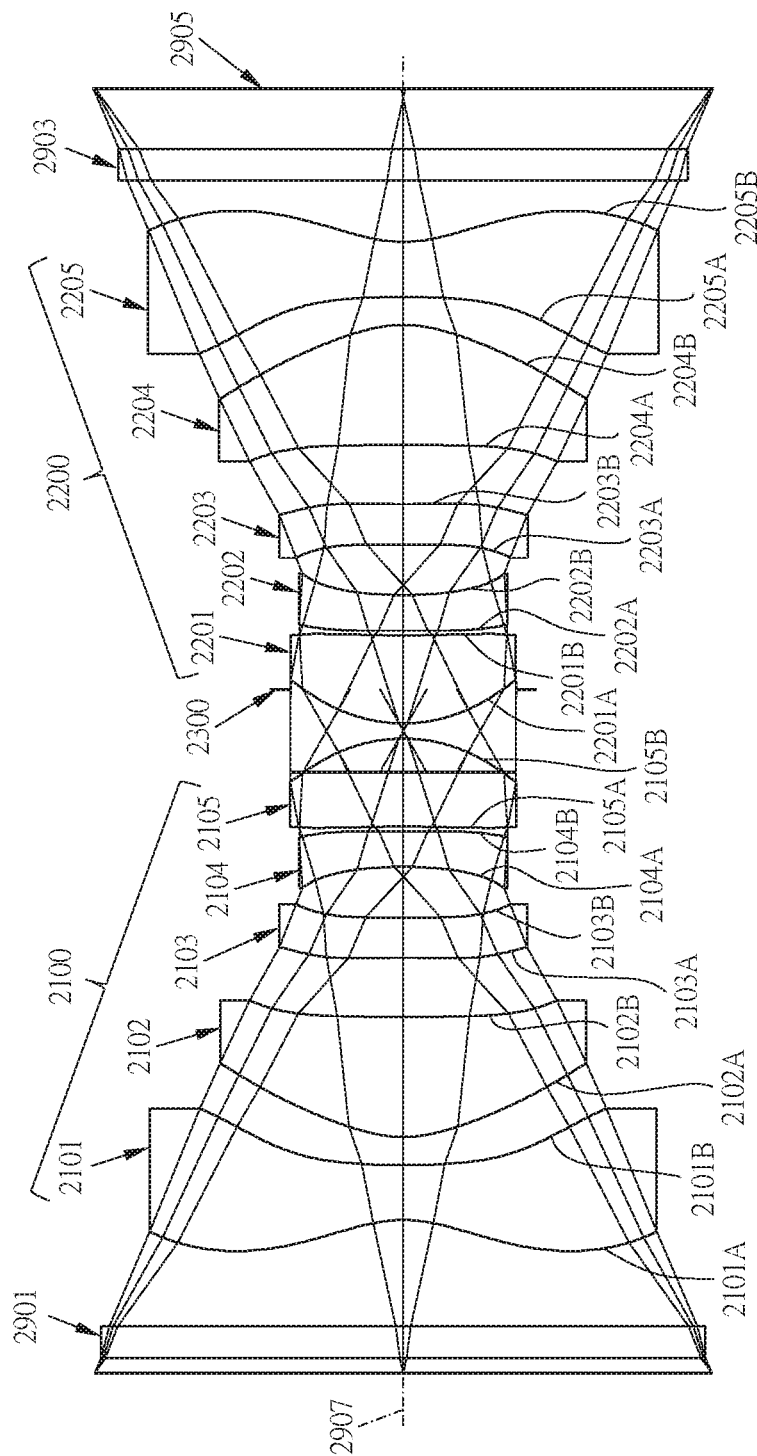
FIG. 2A shows a micro lens assembly for short-range imaging in accordance with a second embodiment of the present invention.
Figure 2B:
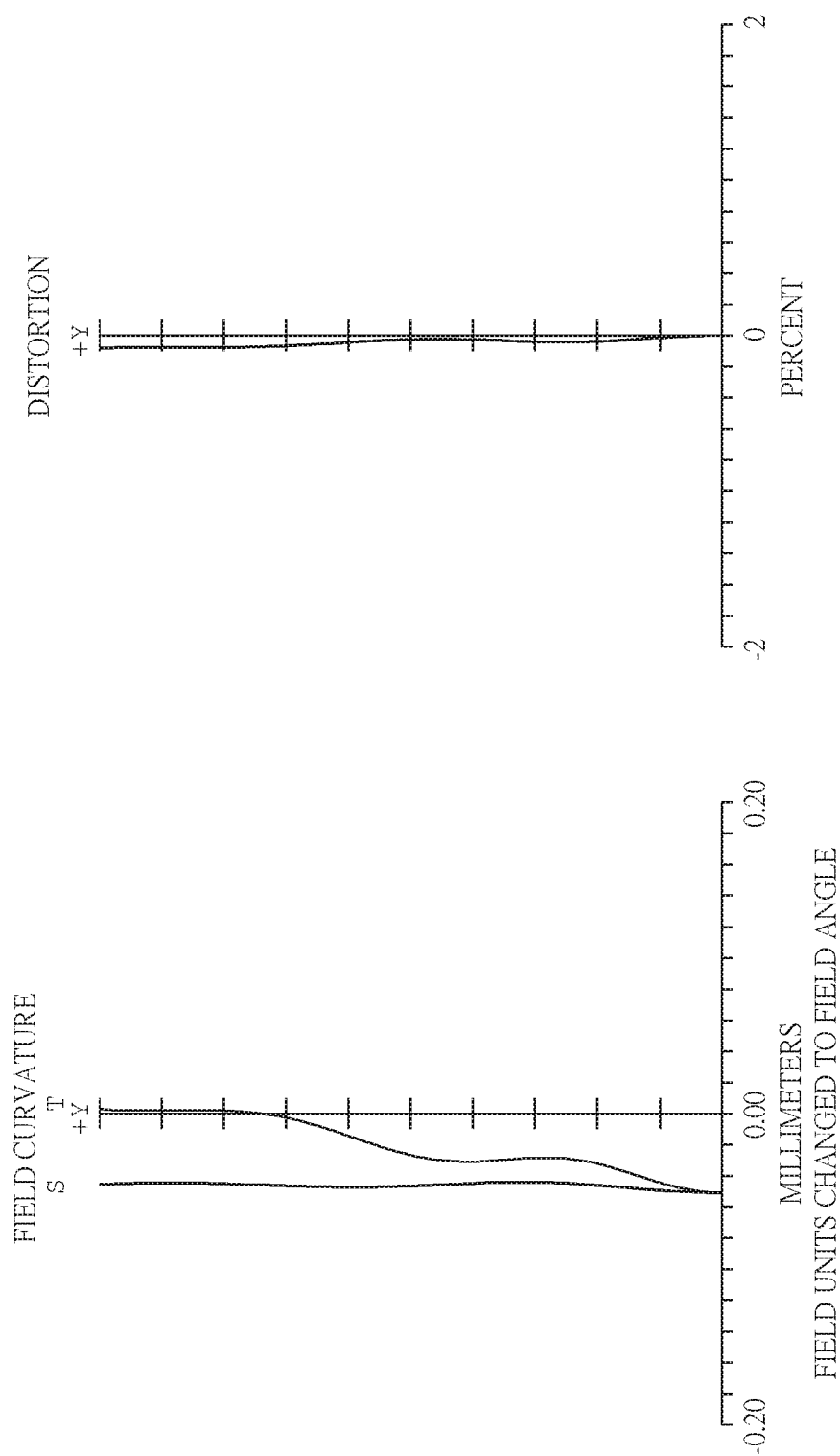
FIG. 2B shows the image plane curve and the distortion curve of the second embodiment of the present invention.

Referring to FIGS. 2A and 2B, FIG. 2A shows a micro lens assembly for short-range imaging in accordance with a second embodiment of the present invention, and FIG. 2B shows, in order from left to right, the image plane curve and the distortion curve of the second embodiment of the present invention. A micro lens assembly for short-range imaging in accordance with the second embodiment of the present invention comprises a stop 2300 and a lens group. The lens group comprises, in order from an object side to an image side: a flat panel 2901, a first lens group 2100, a second lens group 2200, an IR cut filter 2903, and an image plane 2905. The first lens group 2100 comprises five lens elements, in order from the object side to the image side: a first lens element 2101, a second lens element 2102, a third lens element 2103, a fourth lens element 2104, and a fifth lens element 2105. The second lens group 2200 comprises five lens elements, in order from the object side to the image side: a sixth lens element 2201, a seventh lens element 2202, an eighth lens element 2203, a ninth lens element 2204, and a tenth lens element 2205. Wherein the micro lens assembly for short-range imaging has a total of ten lens elements with refractive power.

The stop 2300 is disposed between the first lens group 2100 and the second lens group 2200, and is located between the fifth lens element 2105 and the sixth lens element 2201.

The flat panel 2901 made of glass is located between an object to be imaged and the first lens element 2101 and has no influence on the focal length of the micro lens assembly for short-range imaging.

The first lens group 2100 comprises, in order from the object side to the image side: the first lens element 2101, the second lens element 2102, the third lens element 2103, the fourth lens element 2104, and the fifth lens element 2105.

The first lens element 2101 with a negative refractive power has an object-side surface 2101A being concave near an optical axis 2907 and an image-side surface 2101B being concave near the optical axis 2907, the object-side surface 2101A is provided with an inflection point, the object-side surface 2101A and the image-side surface 2101B are aspheric, and the first lens element 2101 is made of plastic material.

The second lens element 2102 with a positive refractive power has an object-side surface 2102A being convex near the optical axis 2907 and an image-side surface 2102B being concave near the optical axis 2907, the object-side surface 2102A and the image-side surface 2102B are aspheric, and the second lens element 2102 is made of plastic material.

The third lens element 2103 with a negative refractive power has an object-side surface 2103A being concave near the optical axis 2907 and an image-side surface 2103B being convex near the optical axis 2907, the object-side surface 2103A and the image-side surface 2103B are aspheric, and the third lens element 2103 is made of plastic material.

The fourth lens element 2104 with a negative refractive power has an object-side surface 2104A being concave near the optical axis 2907 and an image-side surface 2104B being convex near the optical axis 2907, the object-side surface 2104A and the image-side surface 2104B are aspheric, and the fourth lens element 2104 is made of plastic material.

The fifth lens element 2105 with a positive refractive power has an object-side surface 2105A being concave near the optical axis 2907 and an image-side surface 2105B being convex near the optical axis 2907, the object-side surface 2105A and the image-side surface 2105B are aspheric, and the fifth lens element 2105 is made of plastic material.

The second lens group 2200 comprises, in order from the object side to the image side: the sixth lens element 2201, the seventh lens element 2202, the eighth lens element 2203, the ninth lens element 2204, and the tenth lens element 2205.

The sixth lens element 2201 with a positive refractive power has an object-side surface 2201A being convex near the optical axis 2907 and an image-side surface 2201B being concave near the optical axis 2907, the object-side surface 2201A and the image-side surface 2201B are aspheric, and the sixth lens element 2201 is made of plastic material.

The seventh lens element 2202 with a negative refractive power has an object-side surface 2202A being convex near the optical axis 2907 and an image-side surface 2202B being concave near the optical axis 2907, the object-side surface 2202A and the image-side surface 2202B are aspheric, and the seventh lens element 2202 is made of plastic material.

The eighth lens element 2203 with a positive refractive power has an object-side surface 2203A being convex near the optical axis 2907 and an image-side surface 2003B being concave near the optical axis 2907, the object-side surface 2203A and the image-side surface 2203B are aspheric, and the eighth lens element 2203 is made of plastic material.

The ninth lens element 2204 with a positive refractive power has an object-side surface 2204A being concave near the optical axis 2907 and an image-side surface 2204B being convex near the optical axis 2907, the object-side surface 2204A and the image-side surface 2204B are aspheric, and the ninth lens element 2204 is made of plastic material.

The tenth lens element 2205 with a negative refractive power has an object-side surface 2205A being concave near the optical axis 2907 and an image-side surface 2205B being concave near the optical axis 2907, the object-side surface 2205A and the image-side surface 2205B are aspheric, the image-side surface 2205B is provided with an inflection point, and the tenth lens element 2205 is made of plastic material.

The IR cut filter 2903 is located between the tenth lens element 2205 and the image plane 2905 and has no influence on the focal length of the micro lens assembly for short-range imaging.

The detailed optical data of the second embodiment is shown in table 3, and the aspheric surface data is shown in table 4.

TABLE 3

Embodiment 2
f(focal length) = 1.28 mm, NA = 0.23 mm

| surface | | Curvature Radius | | Thickness | Material | Index | Abbe # | Focal length |
|---|---|---|---|---|---|---|---|---|
| 0 | object | infinity | | 0.000 | | | | |
| 1 | test surface | infinity | | 0.100 | | | | |
| 2 | flat panel | infinity | | 0.210 | glass | 1.517 | 64 | — |
| 3 | | infinity | | 0.706 | | | | |
| 4 | Lens 1 | −1.078 | (ASP) | 0.364 | plastic | 1.544 | 56 | −1.65 |
| 5 | | 6.118 | (ASP) | 0.186 | | | | |
| 6 | Lens 2 | 1.036 | (ASP) | 0.794 | plastic | 1.544 | 56 | 1.99 |
| 7 | | 16.832 | (ASP) | 0.392 | | | | |
| 8 | Lens 3 | −11.555 | (ASP) | 0.269 | plastic | 1.661 | 20.37 | −29.06 |
| 9 | | −28.883 | (ASP) | 0.335 | | | | |
| 10 | Lens 4 | −3.465 | (ASP) | 0.238 | plastic | 1.661 | 20.37 | −6.42 |
| 11 | | −18.727 | (ASP) | 0.029 | | | | |
| 12 | Lens 5 | −9.561 | (ASP) | 0.584 | plastic | 1.544 | 56 | 2.68 |
| 13 | | −1.295 | (ASP) | −0.225 | | | | |
| 14 | shading surface | infinity | | 0.55 | | | | |
| 15 | stop | infinity | | −0.225 | | | | |
| 16 | Lens 6 | 1.295 | (ASP) | 0.584 | plastic | 1.544 | 56 | 2.68 |
| 17 | | 9.561 | (ASP) | 0.029 | | | | |
| 18 | Lens 7 | 18.727 | (ASP) | 0.238 | plastic | 1.661 | 20.37 | −6.42 |
| 19 | | 3.465 | (ASP) | 0.335 | | | | |
| 20 | Lens 8 | 28.883 | (ASP) | 0.269 | plastic | 1.661 | 20.37 | −29.06 |
| 21 | | 11.555 | (ASP) | 0.392 | | | | |
| 22 | Lens 9 | −16.832 | (ASP) | 0.794 | plastic | 1.544 | 56 | 1.99 |
| 23 | | −1.036 | (ASP) | 0.186 | | | | |
| 24 | Lens 10 | −6.118 | (ASP) | 0.364 | plastic | 1.544 | 56 | −1.65 |
| 25 | | 1.078 | (ASP) | 0.406 | | | | |
| 26 | IR-filter | infinity | | 0.210 | glass | 1.517 | 64 | — |
| 27 | | infinity | | 0.400 | | | | |
| 28 | Image plane | infinity | | infinity | | | | |

TABLE 4

Aspheric Coefficients

| surface | 4 | 5 | 6 | 7 | 8 | 9 |
|---|---|---|---|---|---|---|
| K: | −7.0984E+00 | −4.1574E+02 | −6.8986E+00 | 2.9669E+01 | −2.2589E+02 | −9.6197E+02 |
| A: | 1.0452E−01 | 1.1648E−01 | 6.3436E−02 | −3.6354E−02 | 1.6544E−01 | 2.3647E−01 |
| B: | −3.9269E−02 | 4.2470E−02 | −1.2308E−01 | 8.2713E−02 | 1.4558E−01 | 2.1961E−01 |
| C: | 1.0189E−02 | −7.5238E−02 | 1.6637E−01 | 1.2348E−02 | −4.9513E−01 | −1.2023E+00 |
| D: | −1.5676E−03 | 3.0007E−02 | −1.1119E−01 | −3.6572E−02 | 7.7237E−01 | 3.1128E+00 |
| E: | 1.3336E−04 | −5.0977E−03 | 3.5171E−02 | 1.1446E−02 | −7.3822E−01 | −4.2436E+00 |
| F: | −5.0427E−06 | 3.2246E−04 | −4.1830E−03 | −1.0432E−03 | 2.7563E−01 | 2.3275E+00 |
| G: | 0.0000E+00 | 0.0000E+00 | 0.0000E+00 | 0.0000E+00 | −9.0088E−03 | −1.8920E−02 |

| surface | 10 | 11 | 12 | 13 | 16 | 17 |
|---|---|---|---|---|---|---|
| K: | 1.1636E+01 | −1.3678E+02 | 1.0583E+02 | −8.4739E+00 | −8.4739E+00 | 1.0583E+02 |
| A: | 7.8025E−04 | 8.2263E−02 | 1.5851E−01 | −4.5695E−01 | 4.5695E−01 | −1.5851E−01 |
| B: | −3.8438E−01 | −1.9466E−01 | 1.2960E−01 | 7.1764E−01 | −7.1764E−01 | −1.2960E−01 |
| C: | 8.7142E−01 | −2.1758E+00 | −3.0814E+00 | −1.1467E+00 | 1.1467E+00 | 3.0814E+00 |
| D: | −2.3821E+00 | 7.4874E+00 | 9.4346E+00 | 1.3169E+00 | −1.3169E+00 | −9.4346E+00 |
| E: | 3.8810E+00 | −8.9024E+00 | −1.0877E+01 | −8.8386E−01 | 8.8386E−01 | 1.0877E+01 |
| F: | −2.6320E+00 | 3.6519E+00 | 4.5226E+00 | 3.5476E−01 | −3.5476E−01 | −4.5226E+00 |
| G: | −1.0501E−01 | −5.7946E−02 | 0.0000E+00 | 0.0000E+00 | 0.0000E+00 | 0.0000E+00 |

TABLE 4-continued

Aspheric Coefficients

| surface | 18 | 19 | 20 | 21 | 22 | 23 |
|---|---|---|---|---|---|---|
| K: | 2.9669E+01 | 1.1636E+01 | −9.6197E+02 | −2.2589E+02 | −9.6197E+02 | −6.8986E+00 |
| A: | −8.2263E−02 | −7.8025E−04 | −2.3647E−01 | −1.6544E−01 | 3.6354E−02 | −6.3436E−02 |
| B: | 1.9466E−01 | 3.8438E−01 | −2.1961E−01 | −1.4558E−01 | −8.2713E−02 | 1.2308E−01 |
| C: | 2.1758E+00 | −8.7142E−01 | 1.2023E+00 | 4.9513E−01 | −1.2348E−01 | −1.6637E−01 |
| D: | −7.4874E+00 | 2.3821E+00 | −3.1128E+00 | −7.7237E−01 | 3.6572E−02 | 1.1119E−01 |
| E: | 8.9024E+00 | −3.8810E+00 | 4.2436E+00 | 7.3822E−01 | −1.1446E−02 | −3.5171E−02 |
| F: | −3.6519E+00 | 2.6320E+00 | −2.3275E+00 | −2.7563E−01 | 1.0432E−03 | 4.1830E−03 |
| G: | 5.7946E−02 | 1.0501E−01 | 1.8920E−02 | 9.0088E−03 | 0.0000E+00 | 0.0000E+00 |

| surface | 24 | 25 |
|---|---|---|
| K: | −4.1574E+02 | −7.0984E+00 |
| A: | −1.1648E−01 | −1.0452E−01 |
| B: | −4.2470E−02 | 3.9269E−02 |
| C: | 7.5238E−02 | −1.0189E−02 |
| D: | −3.0007E−02 | 1.5676E−03 |
| E: | 5.0977E−03 | −1.3336E−04 |
| F: | −3.2246E−04 | 5.0427E−06 |
| G: | 0.0000E+00 | 0.0000E+00 |

In the second embodiment, the equation of the aspheric surface profiles of the aforementioned lens elements is the same as the equation of the first embodiment. Also, the definitions of these parameters shown in the following table are the same as those stated in the first embodiment with corresponding values for the second embodiment, so an explanation in this regard will not be provided again.

Moreover, these parameters can be calculated from Table 3 and Table 4 as the following values and satisfy the following conditions:

| Embodiment 2 | | | |
|---|---|---|---|
| f[mm] | 1.28 | LF/RF | 1.00 |
| NA[mm] | 0.23 | f/LF | 0.36 |
| TTL | 8.51 | f/RF | 0.36 |
| OTL | 1.02 | | |

Figure 3A:
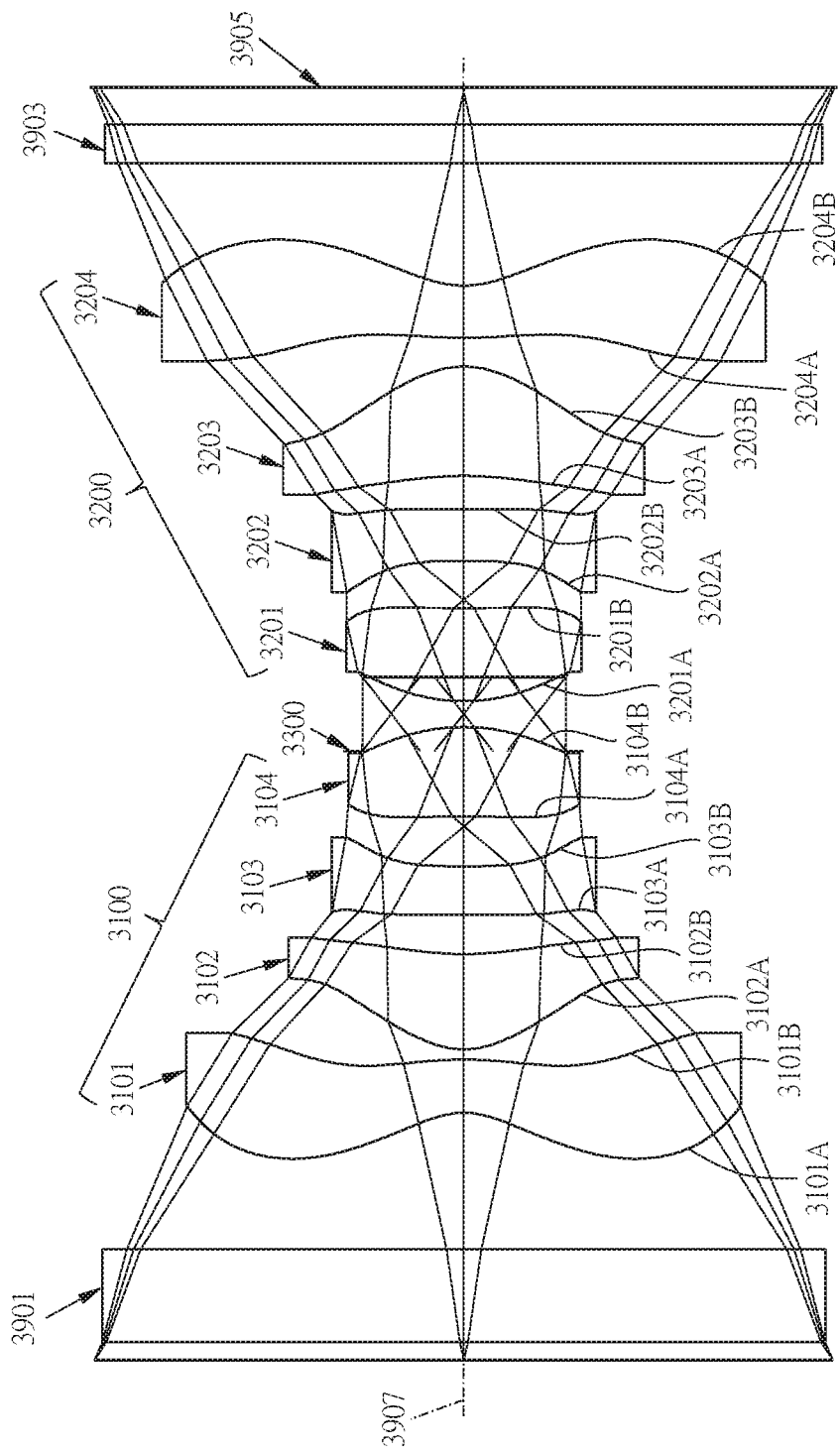
FIG. 3A shows a micro lens assembly for short-range imaging in accordance with a third embodiment of the present invention.
Figure 3B:
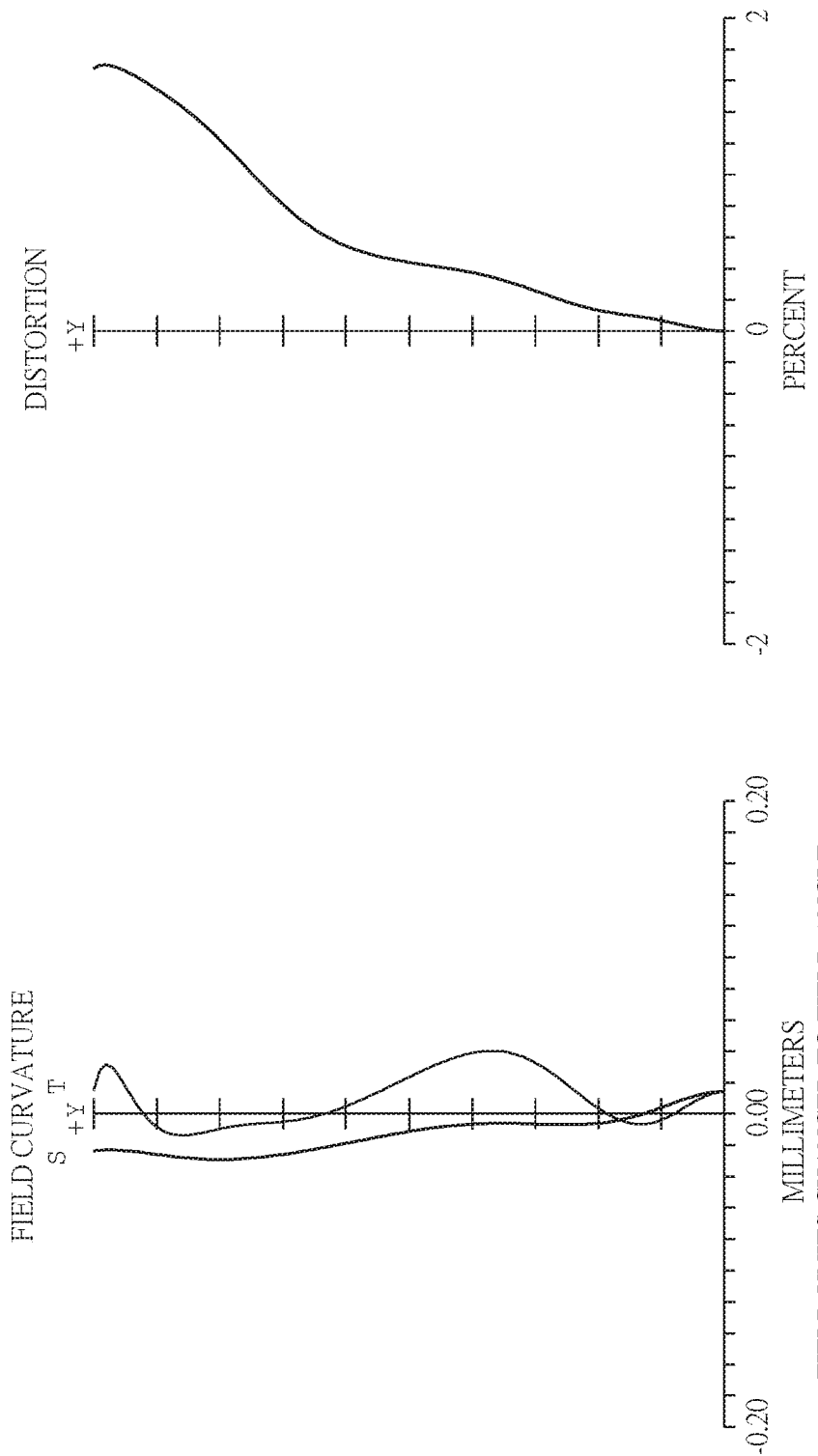
FIG. 3B shows the image plane curve and the distortion curve of the third embodiment of the present invention.

Referring to FIGS. 3A and 3B, FIG. 3A shows a micro lens assembly for short-range imaging in accordance with a third embodiment of the present invention, and FIG. 3B shows, in order from left to right, the image plane curve and the distortion curve of the third embodiment of the present invention. A micro lens assembly for short-range imaging in accordance with the third embodiment of the present invention comprises a stop 3300 and a lens group. The lens group comprises, in order from an object side to an image side: a flat panel 3901, a first lens group 3100, a second lens group 3200, an IR cut filter 3903, and an image plane 3905. The first lens group 3100 comprises four lens elements, in order from the object side to the image side: a first lens element 3101, a second lens element 3102, a third lens element 3103, and a fourth lens element 3104. The second lens group 3200 comprises four lens elements, in order from the object side to the image side: a fifth lens element 3201, a sixth lens element 3202, a seventh lens element 3203, and an eighth lens element 3204. Wherein the micro lens assembly for short-range imaging has a total of eight lens elements with refractive power.

The stop 3300 is disposed between the first lens group 3100 and the second lens group 3200, and is located between the fourth lens element 3104 and the fifth lens element 3201.

The flat panel 3901 made of glass is located between an object to be imaged and the first lens element 3101 and has no influence on the focal length of the micro lens assembly for short-range imaging.

The first lens group 3100 comprises, in order from the object side to the image side: the first lens element 3101, the second lens element 3102, the third lens element 3103, and the fourth lens element 3104.

The first lens element 3101 with a negative refractive power has an object-side surface 3101A being concave near an optical axis 3907 and an image-side surface 3101B being convex near the optical axis 3907, the object-side surface 3101A is provided with an inflection point, the object-side surface 3101A and the image-side surface 3101B are aspheric, and the first lens element 3101 is made of plastic material.

The second lens element 3102 with a positive refractive power has an object-side surface 3102A being convex near the optical axis 3907 and an image-side surface 3102B being concave near the optical axis 3907, the object-side surface 3102A and the image-side surface 3102B are aspheric, and the second lens element 3102 is made of plastic material.

The third lens element 3103 with a negative refractive power has an object-side surface 3103A being concave near the optical axis 3907 and an image-side surface 3103B being convex near the optical axis 3907, the object-side surface 3103A and the image-side surface 3103B are aspheric, and the third lens element 3103 is made of plastic material.

The fourth lens element 3104 with a positive refractive power has an object-side surface 3104A being concave near the optical axis 3907 and an image-side surface 3104B being convex near the optical axis 3907, the object-side surface 3104A and the image-side surface 3104B are aspheric, and the fourth lens element 3104 is made of plastic material.

The second lens group 3200 comprises, in order from the object side to the image side: the fifth lens element 3201, the sixth lens element 3202, the seventh lens element 3203, and the eighth lens element 3204.

The fifth lens element 3201 with a positive refractive power has an object-side surface 3201A being convex near the optical axis 3907 and an image-side surface 3201B being concave near the optical axis 3907, the object-side surface 3201A and the image-side surface 3201B are aspheric, and the fifth lens element 3201 is made of plastic material.

The sixth lens element 3202 with a negative refractive power has an object-side surface 3202A being concave near the optical axis 3907 and an image-side surface 3202B being convex near the optical axis 3907, the object-side surface 3202A and the image-side surface 3202B are aspheric, and the sixth lens element 3202 is made of plastic material.

The seventh lens element 3203 with a positive refractive power has an object-side surface 3203A being concave near the optical axis 3907 and an image-side surface 3203B being convex near the optical axis 3907, the object-side surface 3203A and the image-side surface 3203B are aspheric, and the seventh lens element 3203 is made of plastic material.

The eighth lens element 3204 with a negative refractive power has an object-side surface 3204A being convex near the optical axis 3907 and an image-side surface 3204B being concave near the optical axis 3907, the object-side surface 3204A and the image-side surface 3204B are provided with inflection points and are aspheric, and the eighth lens element 3204 is made of plastic material.

The IR cut filter 3903 is located between the eighth lens element 3204 and the image plane 3905 and has no influence on the focal length of the micro lens assembly for short-range imaging.

The detailed optical data of the third embodiment is shown in table 5, and the aspheric surface data is shown in table 6.

TABLE 5

Embodiment 3
f(focal length) = 1.25 mm, NA = 0.24 mm

| surface | | Curvature Radius | | Thickness | Material | Index | Abbe # | Focal length |
|---|---|---|---|---|---|---|---|---|
| 0 | object | infinity | | 0.000 | | | | |
| 1 | test surface | infinity | | 0.100 | | | | |
| 2 | flat panel | infinity | | 0.500 | glass | 1.517 | 64 | — |
| 3 | | infinity | | 0.739 | | | | |
| 4 | Lens 1 | −0.510 | (ASP) | 0.287 | plastic | 1.544 | 56 | −1.24 |
| 5 | | −2.482 | (ASP) | 0.055 | | | | |
| 6 | Lens 2 | 0.539 | (ASP) | 0.516 | plastic | 1.544 | 56 | 1.16 |
| 7 | | 2.325 | (ASP) | 0.212 | | | | |
| 8 | Lens 3 | −17.057 | (ASP) | 0.261 | plastic | 1.661 | 20.4 | −6.42 |
| 9 | | 5.752 | (ASP) | 0.269 | | | | |
| 10 | Lens 4 | −7.546 | (ASP) | 0.484 | plastic | 1.544 | 56 | 2.86 |
| 11 | | −1.324 | (ASP) | −0.130 | | | | |
| 12 | stop | infinity | | 0.400 | | | | |
| 13 | shading surface | infinity | | −0.130 | | | | |
| 14 | Lens 5 | 1.268 | (ASP) | 0.501 | plastic | 1.544 | 56 | 2.77 |
| 15 | | 6.666 | (ASP) | 0.257 | | | | |
| 16 | Lens 6 | −5.324 | (ASP) | 0.280 | plastic | 1.661 | 20.4 | −6.79 |
| 17 | | 30.982 | (ASP) | 0.178 | | | | |
| 18 | Lens 7 | −2.617 | (ASP) | 0.591 | plastic | 1.544 | 56 | 1.33 |
| 19 | | −0.614 | (ASP) | 0.156 | | | | |
| 20 | Lens 8 | 4.062 | (ASP) | 0.280 | plastic | 1.544 | 56 | −1.39 |
| 21 | | 0.625 | (ASP) | 0.662 | | | | |
| 22 | IR-filter | infinity | | 0.210 | glass | 1.517 | 64 | — |
| 23 | | infinity | | 0.200 | | | | |
| 24 | Image plane | infinity | | infinity | | | | |

TABLE 6

Aspheric Coefficients

| surface | 4 | 5 | 6 | 7 | 8 | 9 |
|---|---|---|---|---|---|---|
| K: | −5.1799E+00 | −1.7739E+00 | −3.9723E+00 | −1.0617E+01 | −1.0998E+02 | −2.0337E+00 |
| A: | 2.2823E−01 | 3.3088E−01 | 3.4755E−01 | −7.0409E−02 | 2.2735E−01 | 5.0508E−01 |
| B: | −1.6350E−01 | −7.2245E−02 | −9.1740E−01 | −4.4278E−01 | −1.3313E−01 | 7.5166E−01 |
| C: | 1.0371E−01 | −7.0741E−02 | 1.6358E+00 | 1.5326E+00 | 9.1221E−01 | −5.0735E+00 |
| D: | −4.6754E−02 | 4.4464E−02 | −2.5661E+00 | −2.4991E+00 | −2.9516E+00 | 2.7958E+01 |
| E: | 1.4051E−02 | −9.7664E−03 | 2.1874E+00 | 2.6530E+00 | 4.3004E+00 | −8.4937E+01 |
| F: | −2.4194E−03 | 9.5117E−04 | −8.5039E−01 | −1.9827E+00 | −5.8350E+00 | 1.0914E+02 |
| G: | 1.8309E−04 | −4.7413E−05 | 1.1734E−01 | 7.8262E−01 | 3.5145E+00 | −4.9173E+01 |

| surface | 10 | 11 | 14 | 15 | 16 | 17 |
|---|---|---|---|---|---|---|
| K: | −1.0523E+02 | −3.3075E+00 | −3.3360E+00 | −1.7077E+01 | −1.1687E+01 | 1.2090E+02 |
| A: | 1.9604E−01 | −1.3893E−01 | 1.6689E−01 | −1.9173E−01 | −5.1338E−01 | −2.0715E−01 |
| B: | 5.9235E−03 | −2.5503E−02 | 8.0354E−02 | −2.8134E−03 | −7.0966E−01 | 1.4795E−01 |
| C: | 2.8834E+00 | 2.4621E+00 | −2.8367E+00 | −3.3704E+00 | 5.6256E+00 | −1.1172E+00 |
| D: | −1.3094E+01 | −1.6677E+01 | 1.9893E+01 | 1.5830E+01 | −3.4602E+01 | 3.5257E+00 |
| E: | 3.7542E+01 | 6.1792E+01 | −7.6660E+01 | −4.6442E+01 | 1.0610E+02 | −5.3994E+00 |
| F: | −5.8381E+01 | −1.1130E+02 | 1.4437E+02 | 7.3502E+01 | −1.3744E+02 | 7.6072E+00 |
| G: | 3.6785E+01 | 8.0437E+01 | −1.0859E+02 | −4.7727E+01 | 6.2221E+01 | −4.6987E+00 |

| surface | 18 | 19 | 20 | 21 |
|---|---|---|---|---|
| K: | −9.5646E+00 | −3.6526E+00 | 3.0992E+00 | −5.1346E+00 |
| A: | 3.2489E−02 | −3.4428E−01 | −2.6507E−01 | −2.2048E−01 |

TABLE 6-continued

| Aspheric Coefficients | | | | |
|---|---|---|---|---|
| B: | 4.4325E−01 | 9.5051E−01 | 5.4176E−02 | 1.7705E−01 |
| C: | −1.6826E+00 | −1.9159E+00 | 7.5749E−02 | −1.1912E−01 |
| D: | 2.9823E+00 | 3.0706E+00 | −5.1738E−02 | 5.6761E−02 |
| E: | −3.3242E+00 | −2.6661E+00 | 1.2679E−02 | −1.7623E−02 |
| F: | 2.5994E+00 | 1.1073E+00 | −1.0854E−03 | 3.1405E−03 |
| G: | −1.0879E+00 | −1.7791E−01 | −2.4924E−05 | −2.4137E−04 |

In the third embodiment, the equation of the aspheric surface profiles of the aforementioned lens elements is the same as the equation of the first embodiment. Also, the definitions of these parameters shown in the following table are the same as those stated in the first embodiment with corresponding values for the third embodiment, so an explanation in this regard will not be provided again.

Moreover, these parameters can be calculated from Table 5 and Table 6 as the following values and satisfy the following conditions:

| Embodiment 3 | | | |
|---|---|---|---|
| f[mm] | 1.25 | LF/RF | 1.03 |
| NA[mm] | 0.24 | f/LF | 0.48 |
| TTL | 6.90 | f/RF | 0.50 |
| OTL | 1.34 | | |

Figure 4A:
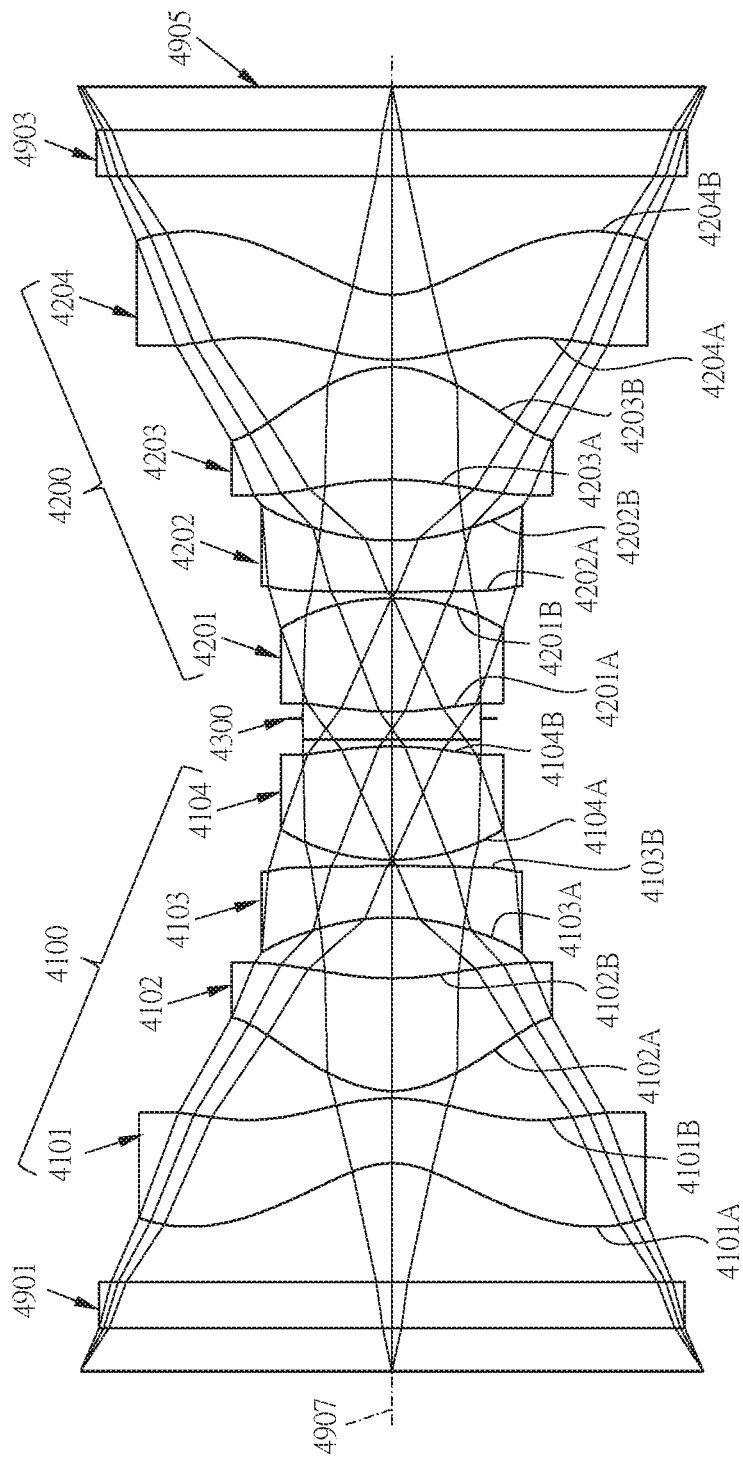
FIG. 4A shows a micro lens assembly for short-range imaging in accordance with a fourth embodiment of the present invention.
Figure 4B:
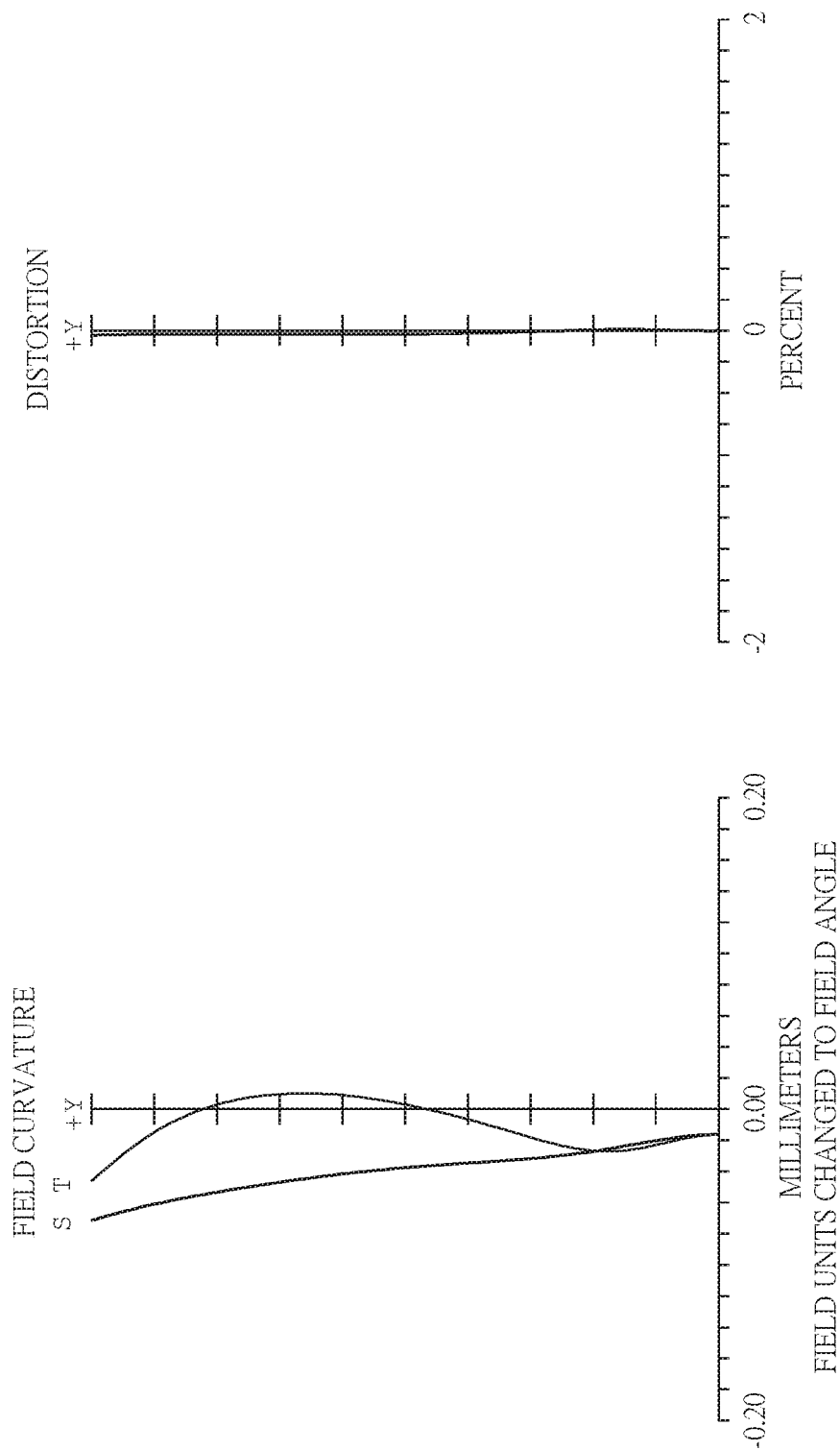
FIG. 4B shows the image plane curve and the distortion curve of the fourth embodiment of the present invention.

Referring to FIGS. 4A and 4B, FIG. 4A shows a micro lens assembly for short-range imaging in accordance with a fourth embodiment of the present invention, and FIG. 4B shows, in order from left to right, the image plane curve and the distortion curve of the fourth embodiment of the present invention. A micro lens assembly for short-range imaging in accordance with the fourth embodiment of the present invention comprises a stop 4300 and a lens group. The lens group comprises, in order from an object side to an image side: a flat panel 4901, a first lens group 4100, a second lens group 4200, an IR cut filter 4903, and an image plane 4905. The first lens group 4100 comprises four lens elements, in order from the object side to the image side: a first lens element 4101, a second lens element 4102, a third lens element 4103, and a fourth lens element 4104. The second lens group 4200 comprises four lens elements, in order from the object side to the image side: a fifth lens element 4201, a sixth lens element 4202, a seventh lens element 4203, and an eighth lens element 4204. Wherein the micro lens assembly for short-range imaging has a total of eight lens elements with refractive power.

The stop 4300 is disposed between the first lens group 4100 and the second lens group 4200, and is located between the fourth lens element 4104 and the fifth lens element 4201.

The flat panel 4901 made of glass is located between an object to be imaged and the first lens element 4101 and has no influence on the focal length of the micro lens assembly for short-range imaging.

The first lens group 4100 comprises, in order from the object side to the image side: the first lens element 4101, the second lens element 4102, the third lens element 4103, and the fourth lens element 4104.

The first lens element 4101 with a negative refractive power has an object-side surface 4101A being concave near an optical axis 4907 and an image-side surface 4101B being convex near the optical axis 4907, the object-side surface 4101A and the image-side surface 4101B are provided with inflection points and are aspheric, and the first lens element 4101 is made of plastic material.

The second lens element 4102 with a positive refractive power has an object-side surface 4102A being convex near the optical axis 4907 and an image-side surface 4102B being concave near the optical axis 4907, the object-side surface 4102A and the image-side surface 4102B are aspheric, and the second lens element 4102 is made of plastic material.

The third lens element 4103 with a negative refractive power has an object-side surface 4103A being concave near the optical axis 4907 and an image-side surface 4103B being convex near the optical axis 4907, the object-side surface 4103A and the image-side surface 4103B are aspheric, and the third lens element 4103 is made of plastic material.

The fourth lens element 4104 with a positive refractive power has an object-side surface 4104A being convex near the optical axis 4907 and an image-side surface 4104B being convex near the optical axis 4907, the object-side surface 4104A and the image-side surface 4104B are aspheric, and the fourth lens element 4104 is made of plastic material.

The second lens group 4200 comprises, in order from the object side to the image side: the fifth lens element 4201, the sixth lens element 4202, the seventh lens element 4203, and the eighth lens element 4204.

The fifth lens element 4201 with a positive refractive power has an object-side surface 4201A being convex near the optical axis 4907 and an image-side surface 4201B being convex near the optical axis 4907, the object-side surface 4201A and the image-side surface 4201B are aspheric, and the fifth lens element 4201 is made of plastic material.

The sixth lens element 4202 with a negative refractive power has an object-side surface 4202A being convex near the optical axis 4907 and an image-side surface 4202B being concave near the optical axis 4907, the object-side surface 4202A and the image-side surface 4202B are aspheric, and the sixth lens element 4202 is made of plastic material.

The seventh lens element 4203 with a positive refractive power has an object-side surface 4203A being concave near the optical axis 4907 and an image-side surface 4203B being convex near the optical axis 4907, the object-side surface 4203A and the image-side surface 4203B are aspheric, and the seventh lens element 4203 is made of plastic material.

The eighth lens element 4204 with a negative refractive power has an object-side surface 4204A being convex near the optical axis 4907 and an image-side surface 4204B being concave near the optical axis 4907, the object-side surface 4204A and the image-side surface 4204B are provided with inflection points and are aspheric, and the eighth lens element 4204 is made of plastic material.

The IR cut filter 4903 is located between the eighth lens element 4204 and the image plane 4905 and has no influence on the focal length of the micro lens assembly for short-range imaging.

The detailed optical data of the fourth embodiment is shown in table 7, and the aspheric surface data is shown in table 8.

TABLE 7

Embodiment 4
f(focal length) = 1.12 mm, NA = 0.23 mm

| surface | | Curvature Radius | | Thickness | Material | Index | Abbe # | Focal length |
|---|---|---|---|---|---|---|---|---|
| 0 | object | infinity | | 0.000 | | | | |
| 1 | test surface | | | 0.200 | | | | |
| 2 | flat panel | infinity | | 0.210 | glass | 1.517 | 64 | — |
| 3 | | infinity | | 0.547 | | | | |
| 4 | Lens 1 | −0.463 | (ASP) | 0.298 | plastic | 1.535 | 55.6 | −1.83 |
| 5 | | −1.069 | (ASP) | 0.034 | | | | |
| 6 | Lens 2 | 0.588 | (ASP) | 0.516 | plastic | 1.544 | 56 | 1.45 |
| 7 | | 1.589 | (ASP) | 0.280 | | | | |
| 8 | Lens 3 | −1.310 | (ASP) | 0.237 | plastic | 1.635 | 24 | −2.91 |
| 9 | | −4.733 | (ASP) | 0.028 | | | | |
| 10 | Lens 4 | 1.506 | (ASP) | 0.520 | plastic | 1.535 | 55.6 | 1.70 |
| 11 | | −2.030 | (ASP) | 0.030 | | | | |
| 12 | shading surface | infinity | | 0.100 | | | | |
| 13 | stop | infinity | | 0.03 | | | | |
| 14 | Lens 5 | 2.030 | (ASP) | 0.520 | plastic | 1.535 | 55.6 | 1.70 |
| 15 | | −1.506 | (ASP) | 0.028 | | | | |
| 16 | Lens 6 | 4.733 | (ASP) | 0.237 | plastic | 1.635 | 24 | −2.91 |
| 17 | | 1.310 | (ASP) | 0.280 | | | | |
| 18 | Lens 7 | −1.589 | (ASP) | 0.516 | plastic | 1.544 | 56 | 1.45 |
| 19 | | −0.588 | (ASP) | 0.034 | | | | |
| 20 | Lens 8 | 1.069 | (ASP) | 0.298 | plastic | 1.535 | 55.6 | −1.83 |
| 21 | | 0.463 | (ASP) | 0.547 | | | | |
| 22 | IR-filter | infinity | | 0.210 | glass | 1.517 | 64 | — |
| 23 | | infinity | | 0.200 | | | | |
| 24 | Image plane | infinity | | infinity | | | | |

TABLE 8

Aspheric Coefficients

| surface | 4 | 5 | 6 | 7 | 8 | 9 |
|---|---|---|---|---|---|---|
| K: | −3.9824E+00 | −6.7525E+00 | −3.6072E+00 | −1.8249E+01 | −2.7138E+00 | −2.8690E+02 |
| A: | 2.5230E−01 | 2.9035E−01 | 2.9028E−01 | −5.6681E−02 | 6.8211E−02 | 3.5562E−01 |
| B: | −1.5825E−01 | −2.4807E−02 | −3.9416E−01 | −1.8501E−01 | 1.8707E−01 | −3.8084E−01 |
| C: | 8.1735E−02 | −1.2643E−01 | 2.7036E−01 | 1.0591E−01 | −1.2342E+00 | −2.6320E+00 |
| D: | −2.5307E−02 | 6.0354E−02 | −3.8742E−01 | 9.8748E−02 | 1.4702E+00 | 3.0291E+00 |
| E: | 4.0188E−03 | −7.2802E−03 | −6.6943E−01 | −1.6777E−01 | −2.1440E+00 | 1.4205E+00 |
| F: | −2.6019E−04 | −3.5081E−04 | 8.6172E−01 | 9.0960E−02 | 1.8304E+00 | −1.6614E+00 |
| G: | 0.0000E+00 | 0.0000E+00 | 0.0000E+00 | 0.0000E+00 | 0.0000E+00 | 0.0000E+00 |

| surface | 10 | 11 | 14 | 15 | 16 | 17 |
|---|---|---|---|---|---|---|
| K: | 4.4216E+00 | −1.4018E+01 | −1.4018E+01 | 4.4216E+00 | −2.8690E+02 | −2.7138E+00 |
| A: | 3.1080E−01 | −1.2537E−01 | −1.2537E−01 | −3.1080E−01 | −3.5562E−01 | −6.8211E−02 |
| B: | −1.2263E+00 | 6.5433E−01 | 6.5433E−01 | 1.2263E+00 | 3.8084E−01 | −1.8707E−01 |
| C: | −8.0878E−01 | −5.1670E+00 | −5.1670E+00 | 8.0878E−01 | 2.6320E+00 | 1.2342E+00 |
| D: | 3.9534E+00 | −7.0733E+00 | −7.0733E+00 | −3.9534E+00 | −3.0291E+00 | −1.4702E+00 |
| E: | 3.3226E+00 | 8.2029E+01 | 8.2029E+01 | −3.3226E+00 | −1.4205E+00 | 2.1440E+00 |
| F: | −2.8941E+01 | −1.2746E+02 | −1.2746E+02 | 2.8941E+01 | 1.6614E+00 | −1.8304E+00 |
| G: | 0.0000E+00 | 0.0000E+00 | 0.0000E+00 | 0.0000E+00 | 0.0000E+00 | 0.0000E+00 |

| surface | 18 | 19 | 20 | 21 |
|---|---|---|---|---|
| K: | −1.8249E+01 | −3.6072E+00 | −6.7525E+00 | −3.9824E+00 |
| A: | 5.6681E−02 | −2.9028E−01 | −2.9035E−01 | −2.5230E−01 |
| B: | 1.8501E−01 | 3.9416E−01 | 2.4807E−02 | 1.5825E−01 |
| C: | −1.0591E−01 | −2.7036E−01 | 1.2643E−01 | −8.1735E−02 |
| D: | −9.8748E−02 | 3.8742E−01 | −6.0354E−02 | 2.5307E−02 |
| E: | 1.6777E−01 | 6.6943E−01 | 7.2802E−03 | −4.0188E−03 |
| F: | −9.0960E−02 | −8.6172E−01 | 3.5081E−04 | 2.6019E−04 |
| G: | 0.0000E+00 | 0.0000E+00 | 0.0000E+00 | 0.0000E+00 |

In the fourth embodiment, the equation of the aspheric surface profiles of the aforementioned lens elements is the same as the equation of the first embodiment. Also, the definitions of these parameters shown in the following table are the same as those stated in the first embodiment with corresponding values for the fourth embodiment, so an explanation in this regard will not be provided again.

Moreover, these parameters can be calculated from Table 7 and Table 8 as the following values and satisfy the following conditions:

| Embodiment 4 | | | |
|---|---|---|---|
| f[mm] | 1.12 | LF/RF | 1.00 |
| NA[mm] | 0.23 | f/LF | 0.57 |
| TTL | 5.90 | f/RF | 0.57 |
| OTL | 0.96 | | |

Figure 5A:
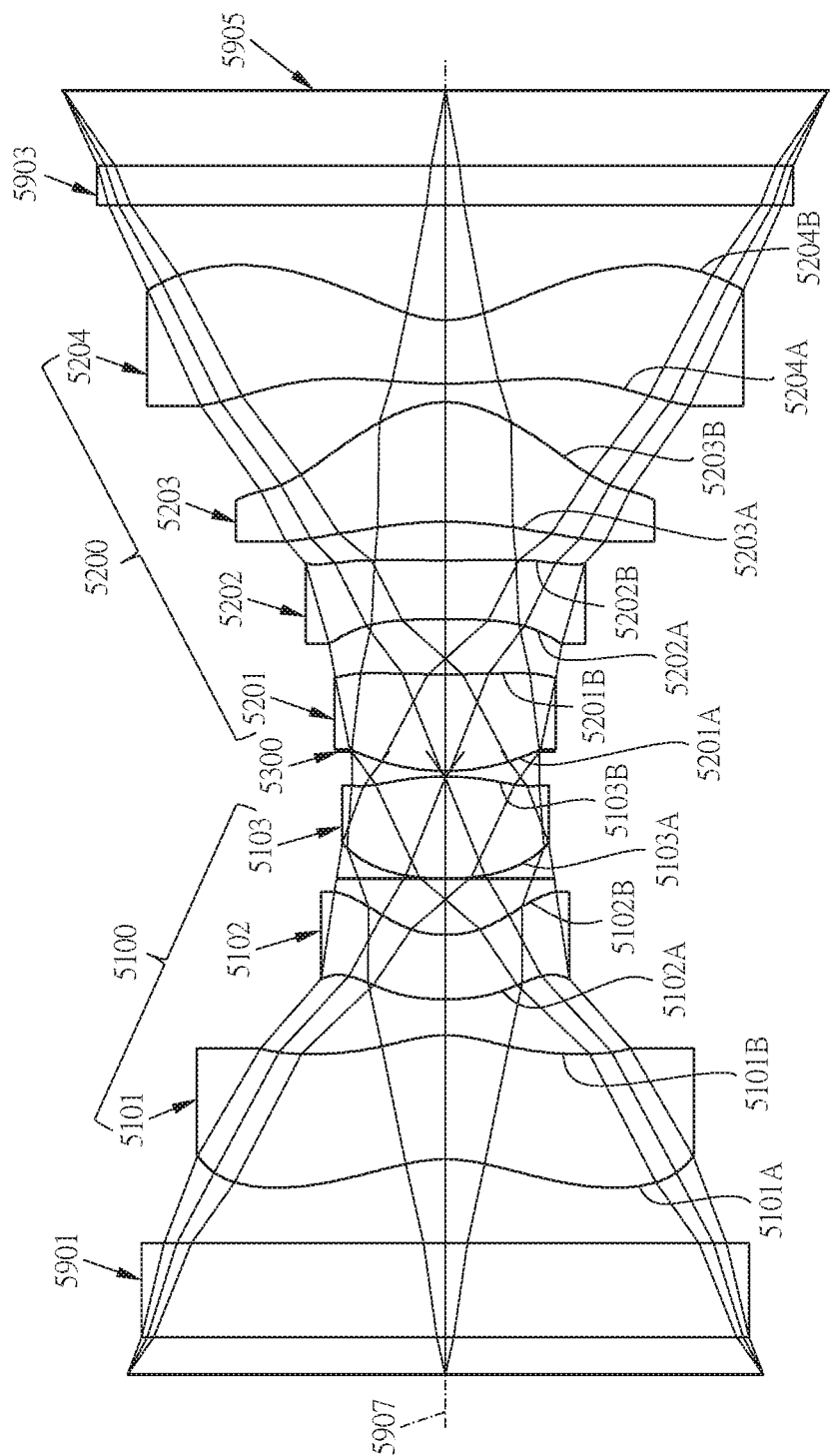
FIG. 5A shows a micro lens assembly for short-range imaging in accordance with a fifth embodiment of the present invention.
Figure 5B:
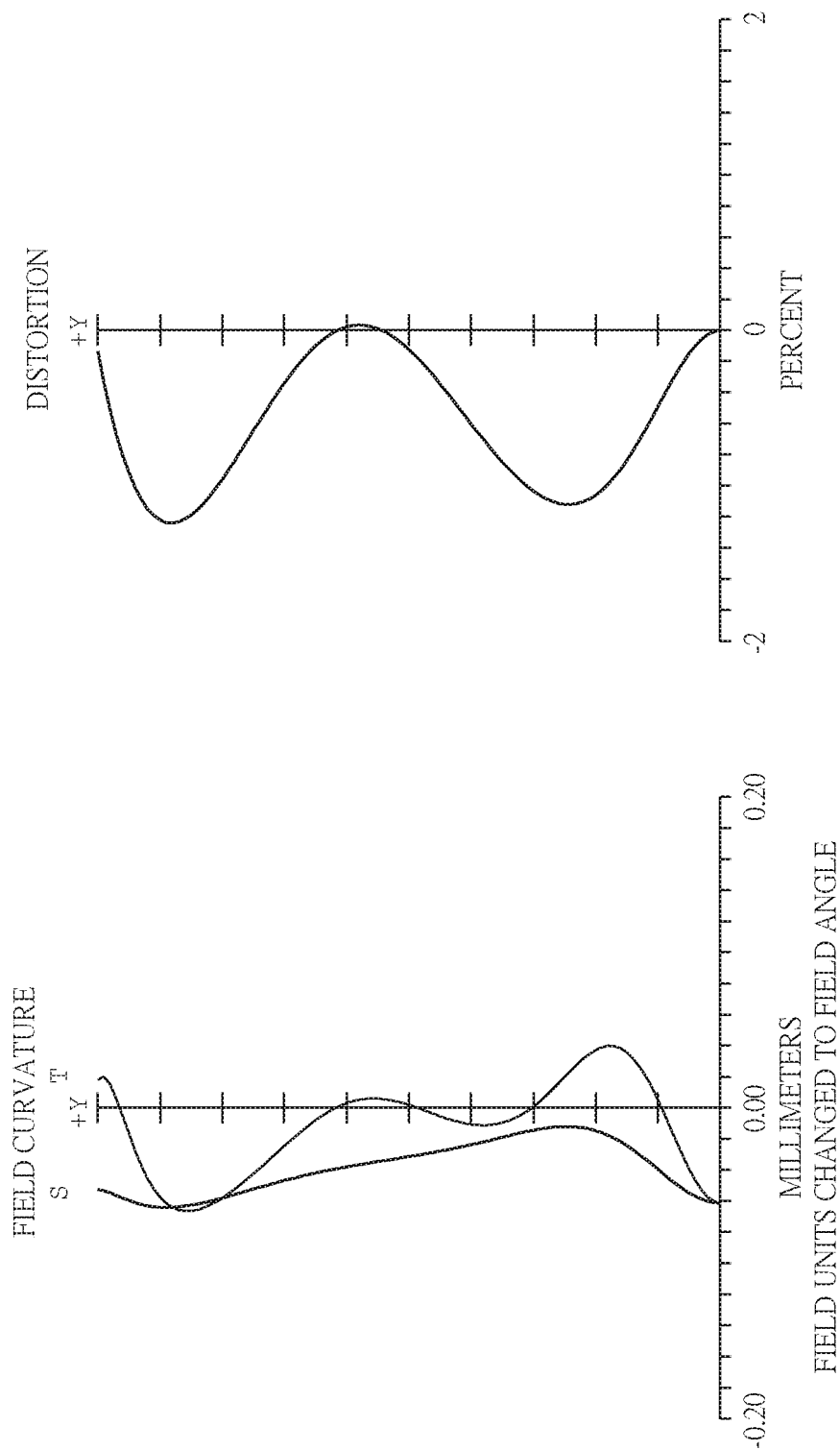
FIG. 5B shows the image plane curve and the distortion curve of the fifth embodiment of the present invention.

Referring to FIGS. 5A and 5B, FIG. 5A shows a micro lens assembly for short-range imaging in accordance with a fifth embodiment of the present invention, and FIG. 5B shows, in order from left to right, the image plane curve and the distortion curve of the fifth embodiment of the present invention. A micro lens assembly for short-range imaging in accordance with the fifth embodiment of the present invention comprises a stop 5300 and a lens group. The lens group comprises, in order from an object side to an image side: a flat panel 5901, a first lens group 5100, a second lens group 5200, an IR cut filter 5903, and an image plane 5905. The first lens group 5100 comprises three lens elements, in order from the object side to the image side: a first lens element 5101, a second lens element 5102, and a third lens element 5103. The second lens group 5200 comprises four lens elements, in order from the object side to the image side: a fourth lens element 5201, a fifth lens element 5202, a sixth lens element 5203, and a seventh lens element 5204. Wherein the micro lens assembly for short-range imaging has a total of seven lens elements with refractive power.

The stop 5300 is disposed between the first lens group 5100 and the second lens group 5200, and is located between the third lens element 5103 and the fourth lens element 5201.

The flat panel 5901 made of glass is located between an object to be imaged and the first lens element 5101 and has no influence on the focal length of the micro lens assembly for short-range imaging.

The first lens group 5100 comprises, in order from the object side to the image side: the first lens element 5101, the second lens element 5102, and the third lens element 5103.

The first lens element 5101 with a positive refractive power has an object-side surface 5101A being concave near an optical axis 5907 and an image-side surface 5101B being convex near the optical axis 5907, the object-side surface 5101A and the image-side surface 5101B are provided with inflection points and are aspheric, and the first lens element 5101 is made of plastic material.

The second lens element 5102 with a negative refractive power has an object-side surface 5102A being convex near the optical axis 5907 and an image-side surface 5102B being concave near the optical axis 5907, the object-side surface 5102A and the image-side surface 5102B are aspheric, and the second lens element 5102 is made of plastic material.

The third lens element 5103 with a positive refractive power has an object-side surface 5103A being convex near the optical axis 5907 and an image-side surface 5103B being convex near the optical axis 5907, the object-side surface 5103A and the image-side surface 5103B are aspheric, and the third lens element 5103 is made of plastic material.

The second lens group 5200 comprises, in order from the object side to the image side: the fourth lens element 5201, the fifth lens element 5202, the sixth lens element 5203, and the seventh lens element 5204.

The fourth lens element 5201 with a positive refractive power has an object-side surface 5201A being convex near the optical axis 5907 and an image-side surface 5201B being concave near the optical axis 5907, the object-side surface 5201A and the image-side surface 5201B are aspheric, and the fourth lens element 5201 is made of plastic material.

The fifth lens element 5202 with a negative refractive power has an object-side surface 5202A being concave near the optical axis 5907 and an image-side surface 5202B being convex near the optical axis 5907, the object-side surface 5202A and the image-side surface 5202B are aspheric, and the fifth lens element 5202 is made of plastic material.

The sixth lens element 5203 with a positive refractive power has an object-side surface 5203A being concave near the optical axis 5907 and an image-side surface 5203B being convex near the optical axis 5907, the object-side surface 5203A and the image-side surface 5203B are aspheric, and the sixth lens element 5203 is made of plastic material.

The seventh lens element 5204 with a negative refractive power has an object-side surface 5204A being convex near the optical axis 5907 and an image-side surface 5204B being concave near the optical axis 5907, the object-side surface 5204A and the image-side surface 5204B are provided with inflection points and are aspheric, and the seventh lens element 5204 is made of plastic material.

The IR cut filter 5903 is located between the seventh lens element 5204 and the image plane 5905 and has no influence on the focal length of the micro lens assembly for short-range imaging.

The detailed optical data of the fifth embodiment is shown in table 9, and the aspheric surface data is shown in table 10.

TABLE 9

Embodiment 5
f(focal length) = 1.20 mm, NA = 0.24 mm

| surface | | Curvature Radius | | Thickness | Material | Index | Abbe # | Focal length |
|---|---|---|---|---|---|---|---|---|
| 0 | object | infinity | | 0.000 | | | | |
| 1 | test surface | | | 0.200 | | | | |
| 2 | flat pane | infinity | | 0.500 | glass | 1.517 | 64 | — |
| 3 | | infinity | | 0.446 | | | | |
| 4 | Lens 1 | −1.080 | (ASP) | 0.661 | plastic | 1.544 | 56 | 2.79 |
| 5 | | −0.769 | (ASP) | 0.191 | | | | |
| 6 | Lens 2 | 2.010 | (ASP) | 0.342 | plastic | 1.661 | 20.4 | −1.87 |
| 7 | | 0.718 | (ASP) | 0.301 | | | | |
| 8 | shading surface | infinity | | 0.000 | | | | |
| 9 | Lens 3 | 1.924 | (ASP) | 0.543 | plastic | 1.544 | 56 | 1.71 |

TABLE 9-continued

Embodiment 5
f(focal length) = 1.20 mm, NA = 0.24 mm

| surface | | Curvature Radius | | Thickness | Material | Index | Abbe # | Focal length |
|---|---|---|---|---|---|---|---|---|
| 10 | | −1.630 | (ASP) | 0.131 | | | | |
| 11 | stop | infinity | | −0.103 | | | | |
| 12 | Lens 4 | 1.409 | (ASP) | 0.514 | plastic | 1.544 | 56 | 3.16 |
| 13 | | 6.716 | (ASP) | 0.294 | | | | |
| 14 | Lens 5 | −7.952 | (ASP) | 0.314 | plastic | 1.661 | 20.4 | −8.16 |
| 15 | | 17.549 | (ASP) | 0.205 | | | | |
| 16 | Lens 6 | −2.471 | (ASP) | 0.637 | plastic | 1.544 | 56 | 1.34 |
| 17 | | −0.615 | (ASP) | 0.099 | | | | |
| 18 | Lens 7 | 3.456 | (ASP) | 0.336 | plastic | 1.544 | 56 | −1.38 |
| 19 | | 0.598 | (ASP) | 0.612 | | | | |
| 20 | IR-filter | infinity | | 0.210 | glass | 1.517 | 64 | — |
| 21 | | infinity | | 0.400 | | | | |
| 22 | Image plane | infinity | | infinity | | | | |

TABLE 10

Aspheric Coefficients

| surface | 4 | 5 | 6 | 7 | 9 | 10 |
|---|---|---|---|---|---|---|
| K: | −5.9743E−01 | −7.6586E+00 | 4.9709E+00 | −4.6237E−01 | 5.6627E+00 | −6.1826E+00 |
| A: | 7.3941E−01 | 7.8130E−01 | 2.0049E+00 | 7.4861E−01 | 4.5363E−01 | 6.5248E−02 |
| B: | −7.9480E−01 | −1.6890E+00 | −1.0623E+01 | −5.1053E+00 | −6.4696E−02 | 3.0994E−01 |
| C: | 7.2791E−01 | 2.5175E+00 | 3.3909E+01 | 9.1405E+00 | 2.1071E+00 | 5.8953E+00 |
| D: | −4.6449E−01 | −2.5987E+00 | −9.3122E+01 | −5.2174E+01 | −2.2333E+01 | −6.4969E+01 |
| E: | 1.9603E−01 | 1.7227E+00 | 1.6093E+02 | 2.1319E+02 | 8.6721E+01 | 3.9926E+02 |
| F: | −4.7658E−02 | −6.2911E−01 | −1.4746E+02 | −3.7681E+02 | −1.5442E+02 | −1.1068E+03 |
| G: | 5.1406E−03 | 9.3337E−02 | 5.3936E+01 | 2.4213E+02 | 1.0952E+02 | 1.1892E+03 |

| surface | 12 | 13 | 14 | 15 | 16 | 17 |
|---|---|---|---|---|---|---|
| K: | −3.0975E+00 | −4.2374E+01 | −3.1088E+01 | 3.5652E+02 | −8.5741E+00 | −3.7425E+00 |
| A: | 1.1731E−01 | −1.4851E−01 | −3.8967E−01 | −1.5173E−01 | 2.2742E−02 | −3.0787E−01 |
| B: | 2.1409E−02 | −8.9809E−03 | −5.0757E−01 | 6.2369E−02 | 2.8776E−01 | 6.1227E−01 |
| C: | −1.4701E+00 | −1.7452E+00 | 2.8446E+00 | −5.8617E−01 | −8.4496E−01 | −9.7547E−01 |
| D: | 8.4110E+00 | 6.7158E+00 | −1.4650E+01 | 1.4991E+00 | 1.2558E+00 | 1.3020E+00 |
| E: | −2.6769E+01 | −1.6395E+01 | 3.7332E+01 | −1.8822E+00 | −1.1803E+00 | −9.3554E−01 |
| F: | 4.2416E+01 | 2.0984E+01 | −3.9522E+01 | 2.2194E+00 | 7.4995E−01 | 3.1970E−01 |
| G: | −2.5900E+01 | −9.8794E+00 | 1.5249E+01 | −1.1017E+00 | −2.3447E−01 | −4.2571E−02 |

| surface | 18 | 19 |
|---|---|---|
| K: | 9.8812E−01 | −4.9052E+00 |
| A: | −2.2388E−01 | −1.6497E−01 |
| B: | 3.6049E−02 | 1.0583E−01 |
| C: | 4.0164E−02 | −6.0064E−02 |
| D: | −2.1975E−02 | 2.4203E−02 |
| E: | 4.3872E−03 | −6.2447E−03 |
| F: | −3.2227E−04 | 8.9784E−04 |
| G: | −1.8346E−06 | −5.3658E−05 |

In the fifth embodiment, the equation of the aspheric surface profiles of the aforementioned lens elements is the same as the equation of the first embodiment. Also, the definitions of these parameters shown in the following table are the same as those stated in the first embodiment with corresponding values for the fifth embodiment, so an explanation in this regard will not be provided again.

Moreover, these parameters can be calculated from Table 9 and Table 10 as the following values and satisfy the following conditions:

| Embodiment 5 | | | |
|---|---|---|---|
| f[mm] | 1.20 | LF/RF | 0.79 |
| NA[mm] | 0.24 | f/LF | 0.54 |
| TTL | 6.83 | f/RF | 0.43 |
| OTL | 1.15 | | |

Figure 6A:
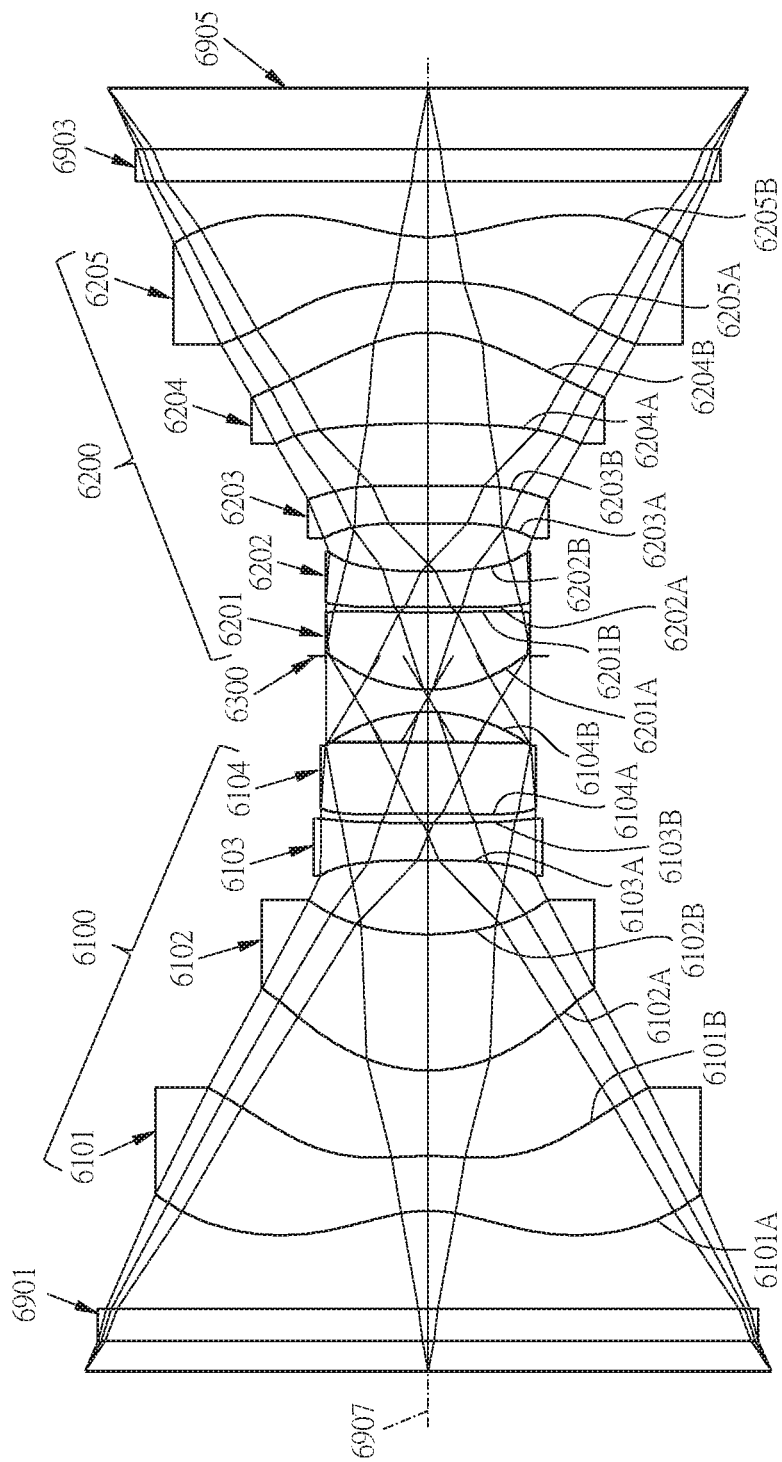
FIG. 6A shows a micro lens assembly for short-range imaging in accordance with a sixth embodiment of the present invention.
Figure 6B:
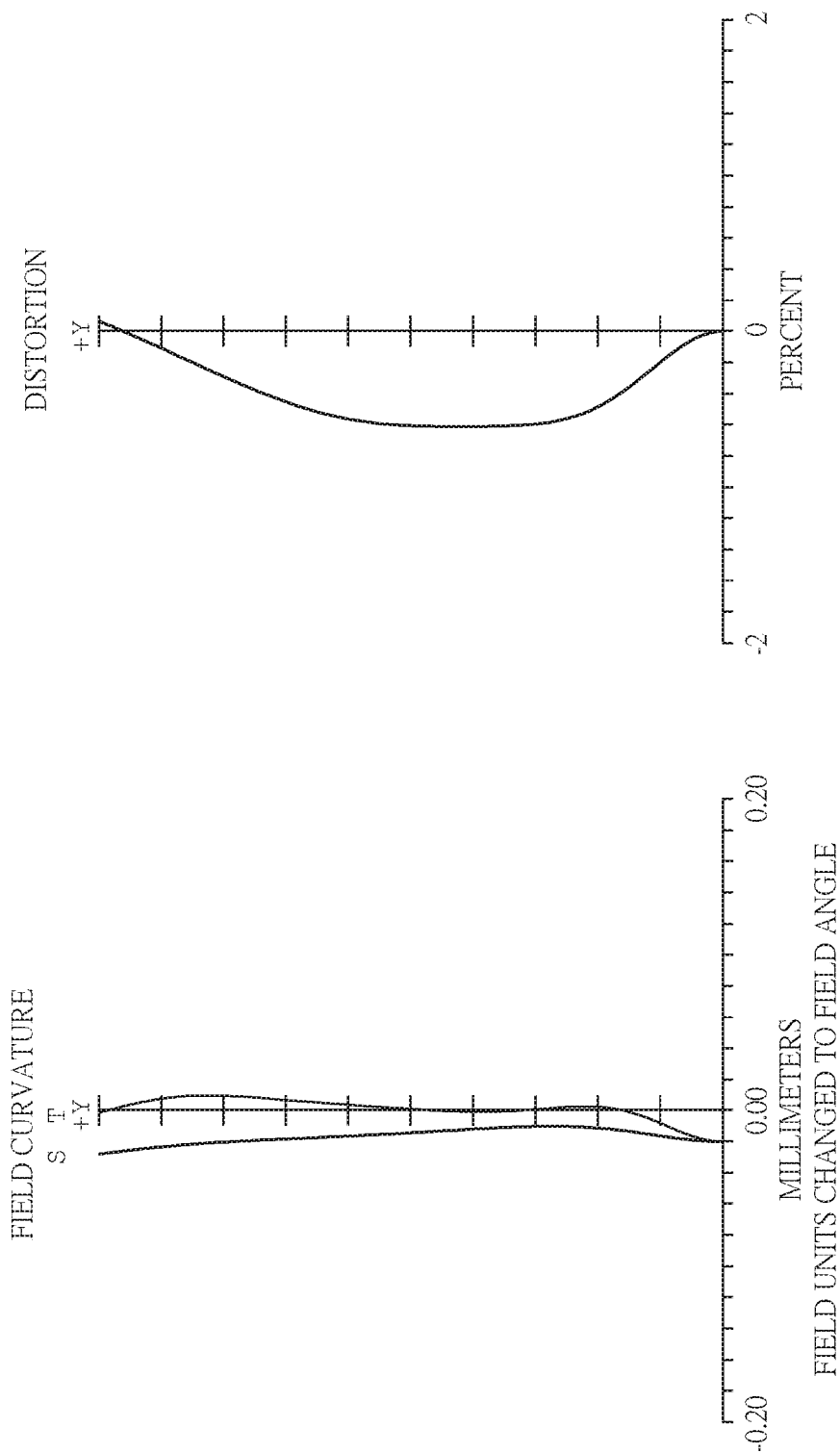
FIG. 6B shows the image plane curve and the distortion curve of the sixth embodiment of the present invention.

Referring to FIGS. 6A and 6B, FIG. 6A shows a micro lens assembly for short-range imaging in accordance with a sixth embodiment of the present invention, and FIG. 6B shows, in order from left to right, the image plane curve and the distortion curve of the sixth embodiment of the present invention. A micro lens assembly for short-range imaging in accordance with the sixth embodiment of the present invention comprises a stop 6300 and a lens group. The lens group comprises, in order from an object side to an image side: a flat panel 6901, a first lens group 6100, a second lens group 6200, an IR cut filter 6903, and an image plane 6905. The first lens group 6100 comprises four lens elements, in order from the object side to the image side: a first lens element 6101, a second lens element 6102, a third lens element 6103, and a fourth lens element 6104. The second lens group 6200 comprises five lens elements, in order from the object side to the image side: a fifth lens element 6201, a sixth lens element 6202, a seventh lens element 6203, an eighth lens element 6204, and a ninth lens element 6205. Wherein the micro lens assembly for short-range imaging has a total of nine lens elements with refractive power.

The stop 6300 is disposed between the first lens group 6100 and the second lens group 6200, and is located between the fourth lens element 6104 and the fifth lens element 6201.

The flat panel 6901 made of glass is located between an object to be imaged and the first lens element 6101 and has no influence on the focal length of the micro lens assembly for short-range imaging.

The first lens group 6100 comprises, in order from the object side to the image side: the first lens element 6101, the second lens element 6102, the third lens element 6103, and the fourth lens element 6104.

The first lens element 6101 with a negative refractive power has an object-side surface 6101A being concave near an optical axis 6907 and an image-side surface 6101B being convex near the optical axis 6907, the object-side surface 6101A and the image-side surface 6101B are provided with inflection points and are aspheric, and the first lens element 6101 is made of plastic material.

The second lens element 6102 with a positive refractive power has an object-side surface 6102A being convex near the optical axis 6907 and an image-side surface 6102B being concave near the optical axis 6907, the object-side surface 6102A and the image-side surface 6102B are aspheric, and the second lens element 6102 is made of plastic material.

The third lens element 6103 with a negative refractive power has an object-side surface 6103A being concave near the optical axis 6907 and an image-side surface 6103B being concave near the optical axis 6907, the object-side surface 6103A and the image-side surface 6103B are aspheric, and the third lens element 6103 is made of plastic material.

The fourth lens element 6104 with a positive refractive power has an object-side surface 6104A being concave near the optical axis 6907 and an image-side surface 6104B being convex near the optical axis 6907, the object-side surface 6104A and the image-side surface 6104B are aspheric, and the fourth lens element 6104 is made of plastic material.

The second lens group 6200 comprises, in order from the object side to the image side: the fifth lens element 6201, the sixth lens element 6202, the seventh lens element 6203, the eighth lens element 6204, and the ninth lens element 6205.

The fifth lens element 6201 with a positive refractive power has an object-side surface 6201A being convex near the optical axis 6907 and an image-side surface 6201B being concave near the optical axis 6907, the object-side surface 6201A and the image-side surface 6201B are aspheric, and the fifth lens element 6201 is made of plastic material.

The sixth lens element 6202 with a negative refractive power has an object-side surface 6202A being concave near the optical axis 6907 and an image-side surface 6202B being concave near the optical axis 6907, the object-side surface 6202A and the image-side surface 6202B are aspheric, and the sixth lens element 6202 is made of plastic material.

The seventh lens element 6203 with a negative refractive power has an object-side surface 6203A being convex near the optical axis 6907 and an image-side surface 6203B being concave near the optical axis 6907, the object-side surface 6203A and the image-side surface 6203B are aspheric, and the seventh lens element 6203 is made of plastic material.

The eighth lens element 6204 with a positive refractive power has an object-side surface 6204A being concave near the optical axis 6907 and an image-side surface 6204B being convex near the optical axis 6907, the object-side surface 6204A and the image-side surface 6204B are aspheric, and the eighth lens element 6204 is made of plastic material.

The ninth lens element 6205 with a negative refractive power has an object-side surface 6205A being concave near the optical axis 6907 and an image-side surface 6205B being convex near the optical axis 6907, the object-side surface 6205A and the image-side surface 6205B are aspheric, the image-side surface 6205B is provided with an inflection point, and the ninth lens element 6205 is made of plastic material.

The IR cut filter 6903 is located between the ninth lens element 6205 and the image plane 6905 and has no influence on the focal length of the micro lens assembly for short-range imaging.

The detailed optical data of the sixth embodiment is shown in table 11, and the aspheric surface data is shown in table 12.

TABLE 11

Embodiment 6
f(focal length) = 1.28 mm, NA = 0.20 mm

| surface | | Curvature Radius | | Thickness | Material | Index | Abbe # | Focal length |
|---|---|---|---|---|---|---|---|---|
| 0 | object | infinity | | 0.000 | | | | |
| 1 | | | | 0.200 | | | | |
| 2 | flat panel | infinity | | 0.210 | glass | 1.517 | 64 | — |
| 3 | | infinity | | 0.639 | | | | |
| 4 | Lens 1 | −1.095 | (ASP) | 0.357 | plastic | 1.544 | 56 | −3.05 |
| 5 | | −3.570 | (ASP) | 0.559 | | | | |
| 6 | Lens 2 | 1.346 | (ASP) | 0.890 | plastic | 1.544 | 56 | 4.40 |
| 7 | | 2.344 | (ASP) | 0.483 | | | | |
| 8 | Lens 3 | −14.010 | (ASP) | 0.241 | plastic | 1.661 | 20.4 | −8.70 |
| 9 | | 9.972 | (ASP) | 0.065 | | | | |
| 10 | Lens 4 | −12.883 | (ASP) | 0.662 | plastic | 1.544 | 56 | 2.75 |
| 11 | | −1.371 | (ASP) | −0.200 | | | | |
| 12 | shading surface | infinity | | 0.565 | | | | |
| 13 | stop | infinity | | −0.220 | | | | |
| 14 | Lens 5 | 1.220 | (ASP) | 0.504 | plastic | 1.544 | 56 | 2.55 |
| 15 | | 8.502 | (ASP) | 0.037 | | | | |
| 16 | Lens 6 | −105.615 | (ASP) | 0.230 | plastic | 1.661 | 20.4 | −6.03 |
| 17 | | 4.188 | (ASP) | 0.315 | | | | |
| 18 | Lens 7 | 43.266 | (ASP) | 0.244 | plastic | 1.661 | 20.4 | −28.05 |
| 19 | | 13.035 | (ASP) | 0.409 | | | | |
| 20 | Lens 8 | −7.985 | (ASP) | 0.592 | plastic | 1.544 | 56 | 2.23 |
| 21 | | −1.084 | (ASP) | 0.333 | | | | |
| 22 | Lens 9 | −4.986 | (ASP) | 0.292 | plastic | 1.544 | 56 | −1.81 |
| 23 | | 1.260 | (ASP) | 0.364 | | | | |
| 24 | IR-filter | infinity | | 0.210 | glass | 1.517 | 64 | — |
| 25 | | infinity | | 0.400 | | | | |
| 26 | Image plane | infinity | | infinity | | | | |

TABLE 12

Aspheric Coefficients

| surface | 4 | 5 | 6 | 7 | 8 | 9 |
|---|---|---|---|---|---|---|
| K: | −8.0589E+00 | −1.5400E+02 | −5.3176E−01 | 4.8225E+00 | −1.3447E+02 | 3.9020E+01 |
| A: | 1.4821E−01 | 3.3399E−01 | 1.2337E−04 | 7.8050E−03 | −1.6171E−01 | −7.8836E−02 |
| B: | −7.3743E−02 | −2.0268E−01 | 1.4999E−03 | 7.5917E−02 | −9.5528E−02 | 1.9926E−02 |
| C: | 2.4931E−02 | 6.6661E−02 | −2.3670E−02 | −1.5086E−01 | 4.9759E−01 | 6.9159E−01 |
| D: | −5.2292E−03 | −1.3510E−02 | 2.7448E−02 | 1.9908E−02 | −1.5375E+00 | −1.3824E+00 |
| E: | 6.3153E−04 | 1.5599E−03 | −2.6314E−02 | 1.0470E−01 | 2.0471E+00 | 9.8160E−01 |
| F: | −3.3436E−05 | −8.0150E−05 | 6.5682E−03 | −8.4320E−02 | −1.2366E+00 | −1.2117E−01 |
| G: | 8.2220E−08 | 3.8380E−07 | 2.9250E−04 | −2.6935E−02 | 4.7843E−02 | −1.9780E−01 |

| surface | 10 | 11 | 14 | 15 | 16 | 17 |
|---|---|---|---|---|---|---|
| K: | 1.1132E+02 | −9.2179E−02 | −8.4773E+00 | 9.3639E+01 | −5.5332E+02 | 1.1539E+01 |
| A: | 4.8797E−02 | 2.9901E−03 | 5.6230E−01 | −1.8767E−01 | −9.2319E−02 | 3.7304E−02 |
| B: | −1.2762E−02 | −1.7813E−02 | −1.0646E+00 | 1.0288E−01 | 5.5426E−01 | 3.2882E−01 |
| C: | 9.9384E−01 | 1.8582E−02 | 2.2792E+00 | 1.5881E+00 | −1.4923E−02 | 8.6452E−01 |
| D: | −1.9751E+00 | 8.4551E−02 | −4.1105E+00 | −5.6605E+00 | −7.9578E−01 | −7.4522E+00 |
| E: | 1.6611E+00 | −1.3257E−01 | 5.4402E+00 | 6.9600E+00 | −1.3729E+00 | 2.4066E+01 |
| F: | −4.2224E−01 | 1.0413E−01 | −4.7596E+00 | −4.9659E+00 | 3.0108E+00 | −3.6664E+01 |
| G: | −1.0812E−01 | 4.2071E−02 | 1.6322E+00 | 2.3976E+00 | −3.8235E−01 | 2.2490E+01 |

| surface | 18 | 19 | 20 | 21 | 22 | 23 |
|---|---|---|---|---|---|---|
| K: | 5.1860E+02 | −5.4891E+02 | 3.8227E+00 | −4.7411E+00 | −8.3790E+01 | −8.2586E+00 |
| A: | −3.2742E−01 | −2.1549E−01 | 4.4833E−02 | −3.1176E−02 | −2.0180E−01 | −1.5077E−01 |
| B: | 4.9736E−02 | −3.3820E−02 | −8.9197E−02 | 3.1648E−02 | 3.8396E−02 | 8.4445E−02 |
| C: | −5.3753E−02 | −1.3705E−01 | −1.1260E−02 | −2.7409E−02 | 7.1751E−02 | −3.3669E−02 |
| D: | 3.3411E+00 | 1.0667E+00 | 9.5796E−02 | 6.0007E−02 | −4.9778E−02 | 8.5590E−03 |
| E: | −9.8717E+00 | −2.3343E+00 | −1.1722E−01 | −5.2924E−02 | 1.3987E−02 | −1.3112E−03 |
| F: | 1.4836E+01 | 2.5896E+00 | 6.5207E−02 | 1.8671E−02 | −1.8800E−03 | 1.0525E−04 |
| G: | −8.6136E+00 | −1.0599E+00 | −1.3016E−02 | −2.3385E−03 | 9.9867E−05 | −3.0812E−06 |

In the sixth embodiment, the equation of the aspheric surface profiles of the aforementioned lens elements is the same as the equation of the first embodiment. Also, the definitions of these parameters shown in the following table are the same as those stated in the first embodiment with corresponding values for the sixth embodiment, so an explanation in this regard will not be provided again.

Moreover, these parameters can be calculated from Table 11 and Table 12 as the following values and satisfy the following conditions:

| Embodiment 6 | | | |
|---|---|---|---|
| f[mm] | 1.28 | LF/RF | 1.07 |
| NA[mm] | 0.20 | f/LF | 0.35 |
| TTL | 8.38 | f/RF | 0.38 |
| OTL | 1.05 | | |

In the present micro lens assembly for short-range imaging, the flat panel and the lens elements can be made of plastic or glass. If the lens elements are made of plastic, the cost will be effectively reduced. If the lens elements are made of glass, there is more freedom in distributing the refractive power of the micro lens assembly for short-range imaging. Plastic lens elements can have aspheric surfaces, which allow more design parameter freedom (than spherical surfaces), so as to reduce the aberration and the number of the lens elements, as well as the total track length of the micro lens assembly for short-range imaging.

In the present micro lens assembly for short-range imaging, if the object-side or the image-side surface of the lens elements with refractive power is convex and the location of the convex surface is not defined, the object-side or the image-side surface of the lens elements near the optical axis is convex. If the object-side or the image-side surface of the lens elements is concave and the location of the concave surface is not defined, the object-side or the image-side surface of the lens elements near the optical axis is concave.

The micro lens assembly for short-range imaging of the present invention can be used in focusing optical systems and can obtain better image quality.

While we have shown and described various embodiments in accordance with the present invention, it should be clear to those skilled in the art that further embodiments may be made without departing from the scope of the present invention.

What is claimed is:

1. A micro lens assembly for short-range imaging, in order from an object side to an image side, comprising: a flat panel made of glass; a first lens group having a plurality of lens elements, a first lens element of the first lens group having an object-side surface being concave near an optical axis, being aspheric and provided with an inflection point; a stop; a second lens group having a plurality of lens elements; and an IR cut filter made of glass; wherein a focal length of the first lens group combined is LF, a focal length of the second lens group combined is RF, a distance from an object to be imaged to the object-side surface of the first lens element of the first lens group along the optical axis is OTL, a distance from the object to be imaged to an image plane along the optical axis is TTL, and they satisfy the relations: LF>0; RF>0; 0.65<LF/RF<1.25; OTL<2.0 mm; TTL<10 mm.

2. The micro lens assembly for short-range imaging as claimed in claim 1, wherein the first lens group comprises at least three lens elements.

3. The micro lens assembly for short-range imaging as claimed in claim 1, wherein the first two lens elements of the first lens group is, in order from the object side to the image side: the first lens element and a second lens element, the first lens element of the first lens group has the object-side surface being concave near the optical axis; the second lens element of the first lens group has an object-side surface being convex near the optical axis and an image-side surface being concave near the optical axis.

4. The micro lens assembly for short-range imaging as claimed in claim 1, wherein the last two lens elements of the first lens group is, in order from the object side to the image side: the penultimate lens element and the last lens element, the penultimate lens element of the first lens group with a negative refractive power, the last lens element of the first lens group with a positive refractive power having an image-side surface being convex near the optical axis.

5. The micro lens assembly for short-range imaging as claimed in claim 1, wherein the second lens group comprises at least three lens elements.

6. The micro lens assembly for short-range imaging as claimed in claim 1, wherein the first two lens elements of the second lens group is, in order from the object side to the image side: a first lens element and a second lens element, the first lens element of the second lens group with a positive refractive power having an object-side surface being convex near the optical axis; the second lens element of the second lens group with a negative refractive power.

7. The micro lens assembly for short-range imaging as claimed in claim 1, wherein the last two lens elements of the second lens group is, in order from the object side to the image side: the penultimate lens element and the last lens element, the penultimate lens element of the second lens group having an object-side surface being concave near the optical axis and an image-side surface being convex near the optical axis, the last lens element of the second lens group having an image-side surface being concave near the optical axis.

8. The micro lens assembly for short-range imaging as claimed in claim 1, wherein a focal length of the micro lens assembly for short-range imaging is f, the focal length of the first lens group combined is LF, the focal length of the second lens group combined is RF, and they satisfy the relations: 0.3<f/LF<0.7; 0.3<f/RF<0.7.

* * * * *